(12) United States Patent
Mackinnon, Jr.

(10) Patent No.: US 11,740,868 B2
(45) Date of Patent: Aug. 29, 2023

(54) SYSTEM AND METHOD FOR SORTING DATA ELEMENTS OF SLABS OF REGISTERS USING A PARALLELIZED PROCESSING PIPELINE

(71) Applicant: Google LLC, Mountain View, CA (US)

(72) Inventor: Allan Stuart Mackinnon, Jr., Seattle, WA (US)

(73) Assignee: Google LLC, Mountain View, CA (US)

(*) Notice: Subject to any disclaimer, the term of this patent is extended or adjusted under 35 U.S.C. 154(b) by 269 days.

(21) Appl. No.: 16/349,348

(22) PCT Filed: Nov. 14, 2017

(86) PCT No.: PCT/US2017/061518
§ 371 (c)(1),
(2) Date: May 13, 2019

(87) PCT Pub. No.: WO2018/089993
PCT Pub. Date: May 17, 2018

(65) Prior Publication Data
US 2019/0347071 A1 Nov. 14, 2019

Related U.S. Application Data

(60) Provisional application No. 62/421,544, filed on Nov. 14, 2016.

(51) Int. Cl.
*G06F 7/36* (2006.01)
*G06F 7/24* (2006.01)
*G06F 9/52* (2006.01)

(52) U.S. Cl.
CPC .................. *G06F 7/36* (2013.01); *G06F 7/24* (2013.01); *G06F 9/52* (2013.01)

(58) Field of Classification Search
None
See application file for complete search history.

(56) References Cited

U.S. PATENT DOCUMENTS 5,671,377 A * 9/1997 Bleidt ................ H04N 21/2387
715/723
5,887,183 A * 3/1999 Agarwal ............. G06F 9/30043
712/2

(Continued)

FOREIGN PATENT DOCUMENTS

CN 104951401 A 9/2015

OTHER PUBLICATIONS

Extended European Search Report for Application No. EP 20177565 dated Nov. 5, 2020.
Fangzhou Wei et al., A hybrid message passing/shared memory parallelization of the adaptive integral method for multi-core clusters, Parallel Computing, Mar. 29, 2011, vol. 37, No. 6, Elsevier, Amsterdam, NL., pp. 279-301.

(Continued)

*Primary Examiner* — Meng Ai T An
*Assistant Examiner* — Zujia Xu
(74) *Attorney, Agent, or Firm* — Botos Churchill IP Law LLP

(57) ABSTRACT

Aspects of the disclosure relate to determining relevant content in response to a request for information. One or more computing devices (170) may load data elements into registers (385A-385B), wherein each register is associated with at least one parallel processor in a group of parallel processors (380A-380B). For each of the parallel processors, the data elements loaded in its associated registers may be sorted, in parallel, in descending order. The sorted data elements, for each of the parallel processors, may be merged with the sorted data elements of other processors in the group. The merged and sorted data elements may be transposed and stored.

12 Claims, 33 Drawing Sheets

(56) References Cited

U.S. PATENT DOCUMENTS

| | | | | |
|---|---|---|---|---|
| 7,489,315 | B1* | 2/2009 | Nordquist | G09G 5/393 345/545 |
| 8,074,224 | B1* | 12/2011 | Nordquist | G06F 9/30123 718/104 |
| 9,766,888 | B2 | 9/2017 | Gueron et al. | |
| 2002/0198911 | A1* | 12/2002 | Blomgren | G06F 15/80 712/E9.034 |
| 2006/0126726 | A1* | 6/2006 | Lin | H04N 19/172 375/E7.181 |
| 2012/0086591 | A1* | 4/2012 | Suryono | H03M 1/0668 341/145 |
| 2012/0259714 | A1* | 10/2012 | Sano | G06Q 30/0601 705/15 |
| 2015/0067008 | A1* | 3/2015 | Kamath | G06F 17/18 708/202 |
| 2017/0177358 | A1* | 6/2017 | Ould-Ahmed-Vall | G06F 9/30043 |

OTHER PUBLICATIONS

International Search Report and Written Opinion for application No. PCT/US2017/061518 dated Feb. 16, 2018.

Tian Xiaochen et al: "Register level sort algorithm on multi-core SIMD processors", Irregular Applications, ACM, 2 Penn Plaza, Suite 701 New York NY 10121-0701 USA., Nov. 17, 2013, pp. 1-8.

Naga Govindaraju et al: "GPUTeraSort", Electronic Proceedings, ACM SIGMOD/PODS 2006 Conference: Jun. 26-29, 2006, Chicago, Illinois, USA, ACM Press, New York, NY., Jun. 27, 2006, pp. 325-336.

Jatin Chhugani et al: "Efficient implementation of sorting on multi-core SIMD CPU architecture", Proceedings of the VLDB Endowment; [ACM Digital Library], Assoc. of Computing Machinery, NY, NY, vol. 1, No. 2, Aug. 1, 2008, pp. 1313-1324.

The First Office Action for Chinese Patent Application No. 201780070349.4, dated Dec. 2, 2022.

* cited by examiner

28 Processor Groups

SYSTEM AND METHOD FOR SORTING DATA ELEMENTS OF SLABS OF REGISTERS USING A PARALLELIZED PROCESSING PIPELINE

CROSS-REFERENCE TO RELATED APPLICATION

The present application is a national phase entry under 35 U.S.C. § 371 of International Application No. PCT/US2017/061518, filed Nov. 14, 2017, published in English, which application claims the benefit of the filing date of U.S. Provisional Patent Application No. 62/421,544, filed Nov. 14, 2016, the disclosures of which are hereby incorporated herein by reference.

BACKGROUND

Being able to quickly and efficiently sort data is essential to many operations of a computing device. For instance, many applications require data sorting in substantially real-time, such as search, data query processing, graphics, sparse linear algebra, machine learning, etc. Many sorting methods rely on a single-threaded CPU performing a sequential sorting algorithm. Such sorting methods are time consuming and require significant processing resources.

Recent improvements to sorting methods include semi-parallelized and parallelized algorithms being performed by data-parallel devices, such as graphics processing units (GPUs). However, there are a number of deficiencies in these semi-parallelized and parallelized algorithms as they are often unable to fully utilize the data-parallel device's compute capacity and reach peak throughput until the number of values to be sorted becomes very large, so to fill the data-parallel device's bandwidth. Additionally, these semi-parallelized algorithms often demonstrate significant branch divergence, with neighboring processing elements not executing the same instruction, preventing the data-parallel device from ever becoming fully compute bound. Processing smaller sets of data elements is similarly inefficient, since the data parallel device may stall while waiting for data to be loaded or stored.

SUMMARY

Embodiments within the disclosure relate generally to sorting data in parallel on a data-parallel computing device. One aspect includes a method comprising: loading, by a group of parallel processors, data elements into registers, wherein each register is associated with at least one parallel processor in the group of parallel processors; for each of the parallel processors, sorting, in parallel, the data elements loaded in its associated registers in descending order; for each of the parallel processors, merging the sorted data elements with the sorted data elements of other processors in the group; and transposing and storing, by the parallel processors, the merged and sorted data elements.

In some embodiments, loading the data elements into registers includes loading the data elements into associated registers of two or more parallel processors simultaneously. In some examples, loading the data elements into each processor's respective registers includes loading the data elements in a transposed order. In some embodiments, sorting the data elements includes executing compare-and-exchange operation of all data elements in the registers associated with the respective parallel processor.

In some instances merging the sorted data elements with the sorted data elements of other processors in the group includes pairing each parallel processor with another parallel processor in the group of processors, and merging the sorted data elements of each parallel processor with the sorted data elements of its respective paired processor.

In some example merging the sorted data elements further includes merging the merged data elements of each pair processor with the other processor pairs. In some instances the group of parallel processors includes two groups of parallel processors. In some examples merging the sorted data elements with the sorted data elements of other processors includes pairing each parallel processor with another parallel processor in the two groups of processors; and merging the sorted data elements of each parallel processor with the sorted data elements of its respective paired processor within each of the two groups of processors. In some embodiments merging the sorted data elements of the two groups of processors.

Another aspect of the disclosure includes a system for sorting data in parallel. The system may include one or more computing devices and memory storing instructions, the instructions executable by the one or more computing devices. The instructions may comprise loading data elements into registers, wherein each register is associated with at least one parallel processor in a group of parallel processors; for each of the parallel processors, sorting, in parallel, the data elements loaded in its associated registers in descending order; for each of the parallel processors, merging the sorted data elements with the sorted data elements of other processors in the group; and transposing and storing, by the parallel processors, the merged and sorted data elements.

Another aspect of the disclosure includes a non-transitory computer readable medium comprising instructions, which when executed by one or more processors, cause the one or more processors to perform the steps of: loading data elements into registers, wherein each register is associated with at least one parallel processor in a group of parallel processors; for each of the parallel processors, sorting, in parallel, the data elements loaded in its associated registers in descending order; for each of the parallel processors, merging the sorted data elements with the sorted data elements of other processors in the group; and transposing and storing, by the parallel processors, the merged and sorted data elements.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Overview

Figure 1:
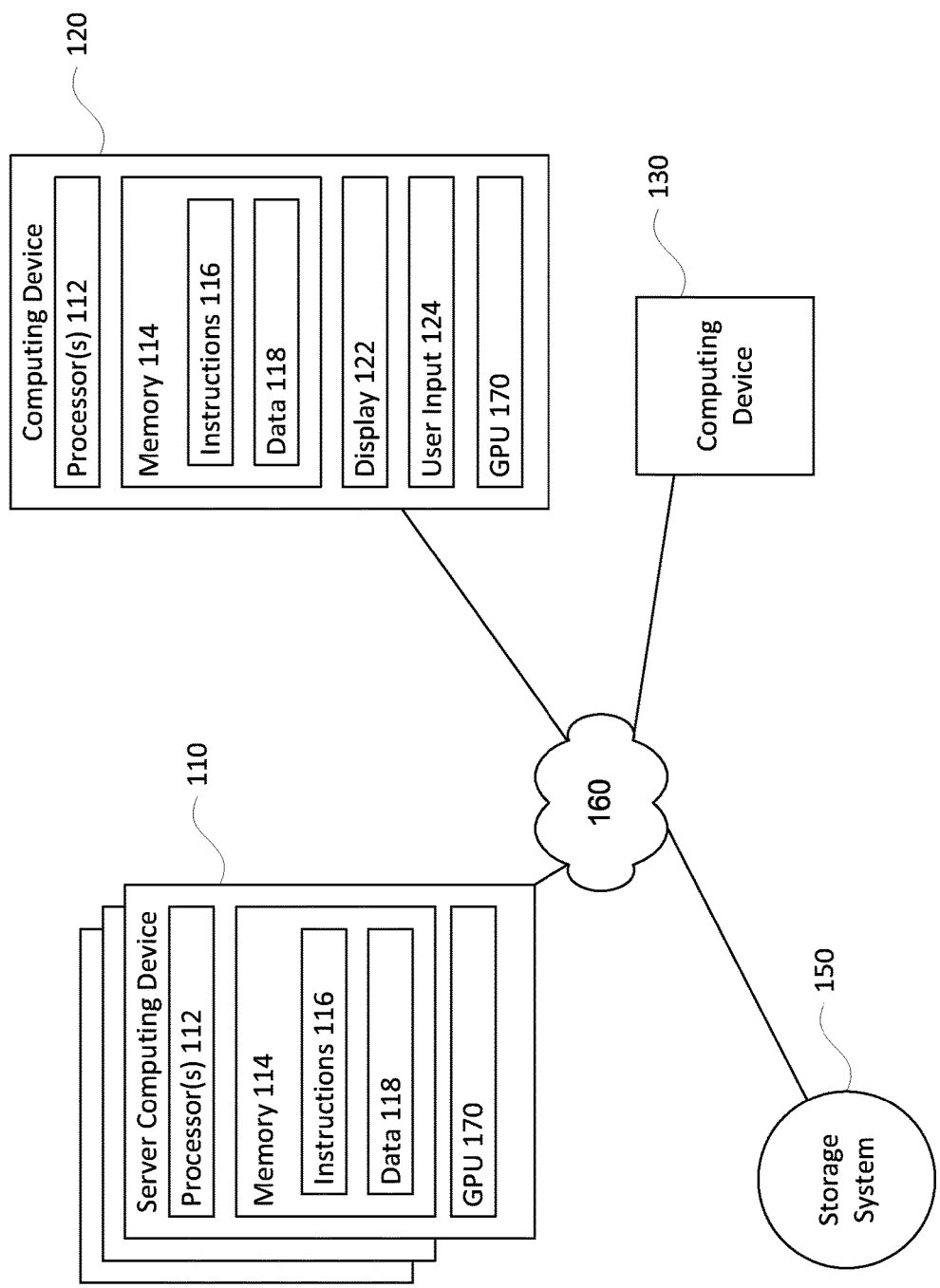
FIG. 1 is a functional diagram of an example system in accordance with aspects of the disclosure.

This technology relates to sorting and mapping data elements on a computer system. In particular, the sorting and mapping of data elements is performed on data-parallel computing devices, such as graphics processing units (GPUs) using a fully parallelized processing pipeline.

The parallelized processing pipeline may be implemented and controlled through customized application programming interfaces (APIs) which provide the data-parallel computing device, such as a graphics processing unit (GPU), with access to kernel programs which perform the processing. In this regard, each respective kernel may constitute a portion of the parallelized processing pipeline, with each kernel utilizing standard APIs and sub-APIs to perform all of the processing of the sorting, merging, mapping, etc., of the data elements.

In order to efficiently execute a fully parallelized processing pipeline, any programs and/or algorithms should execute the same instruction on every element in a processor group, minimize off-chip I/O operations to avoid wasting power and time, and perform on-chip and off-chip memory loads and stores (I/O) in wide, aligned, and coalesced transactions.

To sort data elements on a data-parallel computing device the data elements may be loaded into a slab corresponding to one or more processors groups. Each processor in the processor group may load an optimal number of unsorted data elements from a memory region to a processor-visible memory region, such as registers. In this regard, each processor may store a data element in a register row of the registers. In some examples, data elements may be loaded into slabs simultaneously.

During the loading of the data elements, the data elements may be transposed, thereby simplifying the sorting of the data elements. The loaded data elements may be sorted sequentially within a single processor, with each single processor sorting the data elements in its respective registers simultaneously.

The sorted data elements of each processor may be merged with the other data elements in the registers of the other processors in the processor group and, subsequently, with the data elements in other processor groups if any are used. As such, a sorted column of data elements held by a processor in its respective registers, may be merged with the sorted columns of data elements held by other processors either in the same processor group's slab of data elements, or with coordination, another processor group's slab of data elements.

To merge sorted data elements of the processors together, the rows of registers may be partitioned and written into shared memory by each processor in the processor group. Based on the number of data elements being merged, a processor or processors in the processor group may load a subset of the shared rows in transposed form, thereby replacing the shared subset of register rows. The transposed data elements may then be merged sequentially using an optimal merging network.

At the completion of merging the rows of registers, and in the event that more than one slab is being sorted, the sorted slabs may be merged together. In this regard, power of two based sorted slabs may be sorted using a bitonic sorter. For non-power of two slabs, optimal performance might be achieved only when all available processor groups and their associated resources are utilized by decomposing the slab into power of two slabs. In some instances, sorting networks for non-power of two slabs may be used. After the slabs are merged, the data elements may be considered sorted. The sorted data elements may then be output via transposition to memory in a linear order for further interaction with other programs or storage.

The features described herein allow a program or programs to sort many data elements in parallel. Such sorting of data elements may be performed by a data-parallel computing device in a fully parallelized manner. Such parallelized processing offers significantly faster more efficient sorting than offered by current CPU, GPU, and hybrid vector graphics engines, thereby improving the functioning of computing devices. Moreover, the sorting method described herein achieves high performance on small, bandwidth-limited data-parallel devices, high performance on large, bandwidth-rich data-parallel devices, and high energy efficiency achieved by minimizing off-chip memory load and stores. Further, by sorting data completely on the data-parallel computing device, the system's CPU(s) may be free to perform other processing tasks simultaneously.

Example Systems

Figure 2:
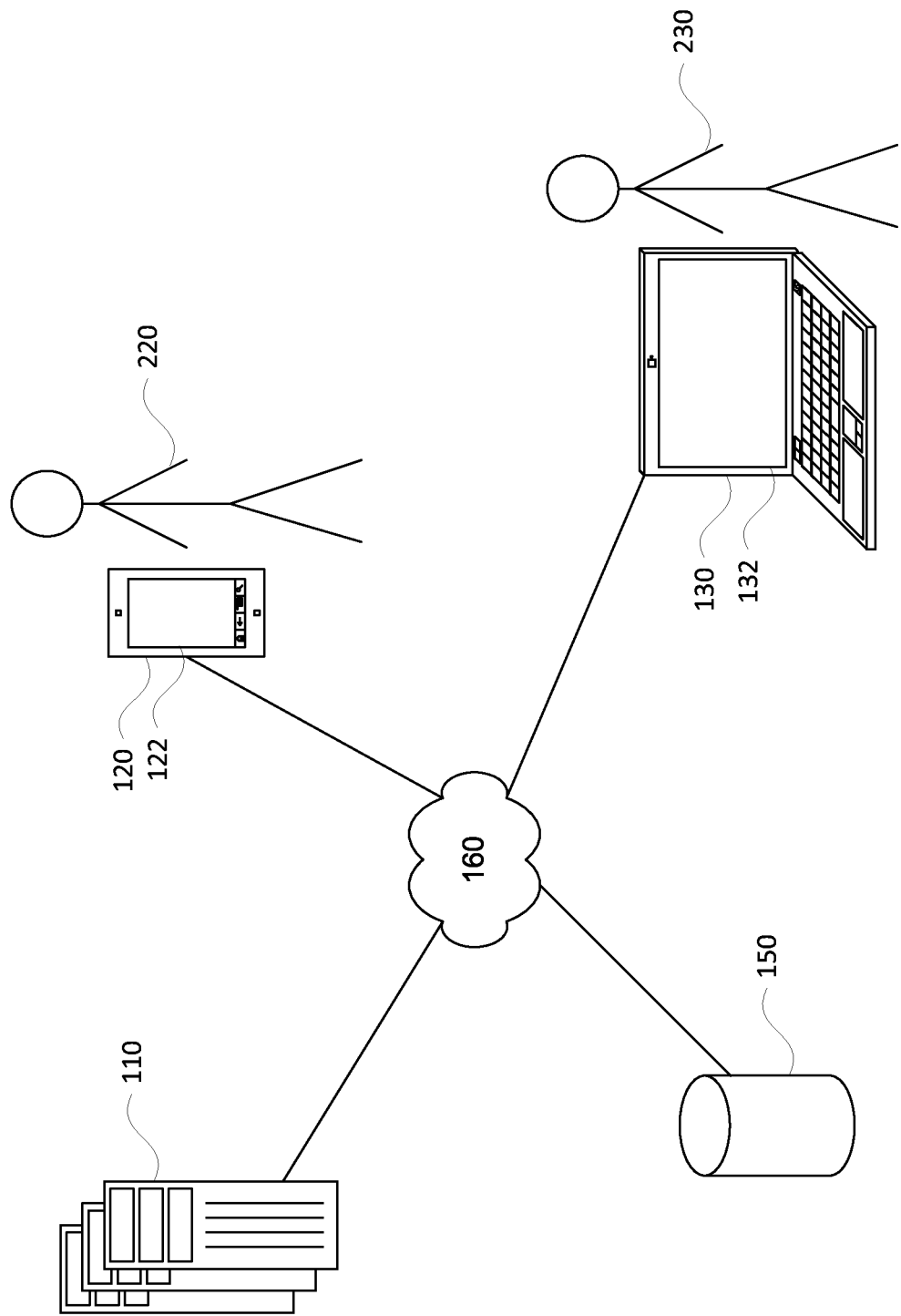
FIG. 2 is a pictorial diagram of the example system of FIG. 1.

FIGS. 1 and 2 show an example system 100 in which the features described herein may be implemented. It should not be considered as limiting the scope of the disclosure or usefulness of the features described herein. In this example, system 100 may include computing devices 110, 120, and 130 as well as storage system 150. Each computing device may contain one or more processors 112, memory 114, one or more graphics processing units (GPUs) 170 and other components typically present in general purpose computing devices. Memory 114 of each of computing devices 110, 120, 130, and 130 may store information accessible by the one or more processors 112, including instructions 116 that can be executed by the one or more processors 112 and/or GPUs 170.

The memory may store data that can be retrieved, manipulated or stored by one or more processors. The memory may be of any non-transitory type capable of storing information accessible by the processor, such as a hard-drive, memory card, ROM, RAM, DVD, CD-ROM, write-capable, and read-only memories. Data elements, such as instructions 116 and data 118, may be held in memory spaces. For example, a graphics processing unit have several memory spaces including: registers, constants, indexable shared local memory, global device memory, local memory, stack memory, parameter memory, and texture memory. Each of these memory spaces may have different properties including different latency, size, concurrent access restrictions relative to the current processing element which, if any, processing elements can access this memory space, random access and indexability defining whether data can be accessed by an index or handle and for what purpose, writability, bandwidth, and access pattern penalties such as bank conflicts, coalescing, cache misses, partition camping, etc. The registers may be directly accessible by processors in a multiprocessor.

The instructions 116 may be any set of instructions to be executed directly, such as machine code, or indirectly, such as scripts, by the one or more processors. In that regard, the terms "instructions," "kernels," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored, and modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor.

The one or more of computing devices 110, 120, and 130 may include specialized hardware components to perform specific computing processes in parallel, such as rasterizing, compositing, and otherwise manipulating vector graphics faster or more efficiently. For instance, the one or more graphics processing units 113 ("GPU") may be any conventional graphics processing units, such as those produced by Intel, AMD, and NVIDIA. Additionally, the one or more GPUs may be single instruction, multiple data (SIMD) devices, single instruction, multiple thread devices (SIMT). Each GPU 113 may have a natural transaction size, such as such as 64, 128, or 256 bytes, or more or less, which equate to 16, 32, or 64 words, respectively. The natural transaction size may be the GPU's architectural width (i.e., within a multiprocessor, such as GPU 113, the number of words which may be processed in a single cycle.)

Although FIG. 1 functionally illustrates the processor, memory, and other elements of the computing devices as being within the same block, the processor, computer, computing device, or memory can actually comprise multiple processors, computers, computing devices, or memories that may or may not be stored within the same physical housing. For example, the memory 114 can be a hard drive or other storage media located in housings different from that of the computing device 110.

References to a processor, computer, computing device, or memory will be understood to include references to a collection of processors, GPUs, computers, computing devices, or memories that may or may not operate in parallel. For instance, the computing device 110 may include server computing devices operating as a load-balanced server farm, distributed system, etc. Yet further, although some functions described below are indicated as taking place on a single computing device having a single processor, such as a graphics processor, various aspects of the subject matter described herein can be implemented by a plurality of computing devices, for example, communicating information over network 160.

Each of the computing devices can be at different nodes of a network 160 and capable of directly and indirectly communicating with other nodes of network 160. Although only a few computing devices 110, 120, and 130 are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 130 via the network. For example, one or more of server computing devices 110 may use network 160 to transmit and present information to a user, such as user 220 or 230, on a display, such as displays 122 or 132 of computing devices 120 or 130, as shown in the system 200 of FIG. 2. In this regard, computing devices 120, and 130 may be considered computing devices, and may perform all or some of the features described herein.

Each of the computing devices 120 and 130 may be configured similarly to the server computing devices 110, with one or more processors, memory and instructions as described above. Each computing device 120 or 130 may be a personal computing device intended for use by a user 220 or 230, and have all of the components normally used in connection with a personal computing device such as a central processing unit (CPU), memory (e.g., RAM and internal hard drives) storing data and instructions, a display such as displays 122 or 132 (e.g., a monitor having a screen, a touch-screen, a projector, a television, or other device that is operable to display information), and user input device 124 (e.g., a mouse, keyboard, touch-screen, or microphone). In another example, computing devices 120-130 may be a head-mounted computing system and/or a virtual reality system. In this regard, an augmented or virtual environment including one or more panoramic images may be presented to a user through a display of the computing device. The computing device may also include a camera for recording video streams and/or capturing images, speakers, a network interface device, and all of the components used for connecting these elements to one another.

Although the computing devices 120 and 130 may each comprise a full-sized personal computing device, they may alternatively comprise mobile computing devices capable of exchanging data with a server, such as server computing device 110, over a network such as the Internet. In this regard, computing device 120 may be a mobile phone or a device such as a wireless-enabled PDA, a tablet PC, digital camera, or a netbook that is capable of obtaining information via the Internet. Computing device 130 may be a tablet or laptop computer which may allow the user to input information using a small keyboard, a keypad, microphone, using visual signals with a camera, a touch screen, etc.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, and 130.

Figure 3:
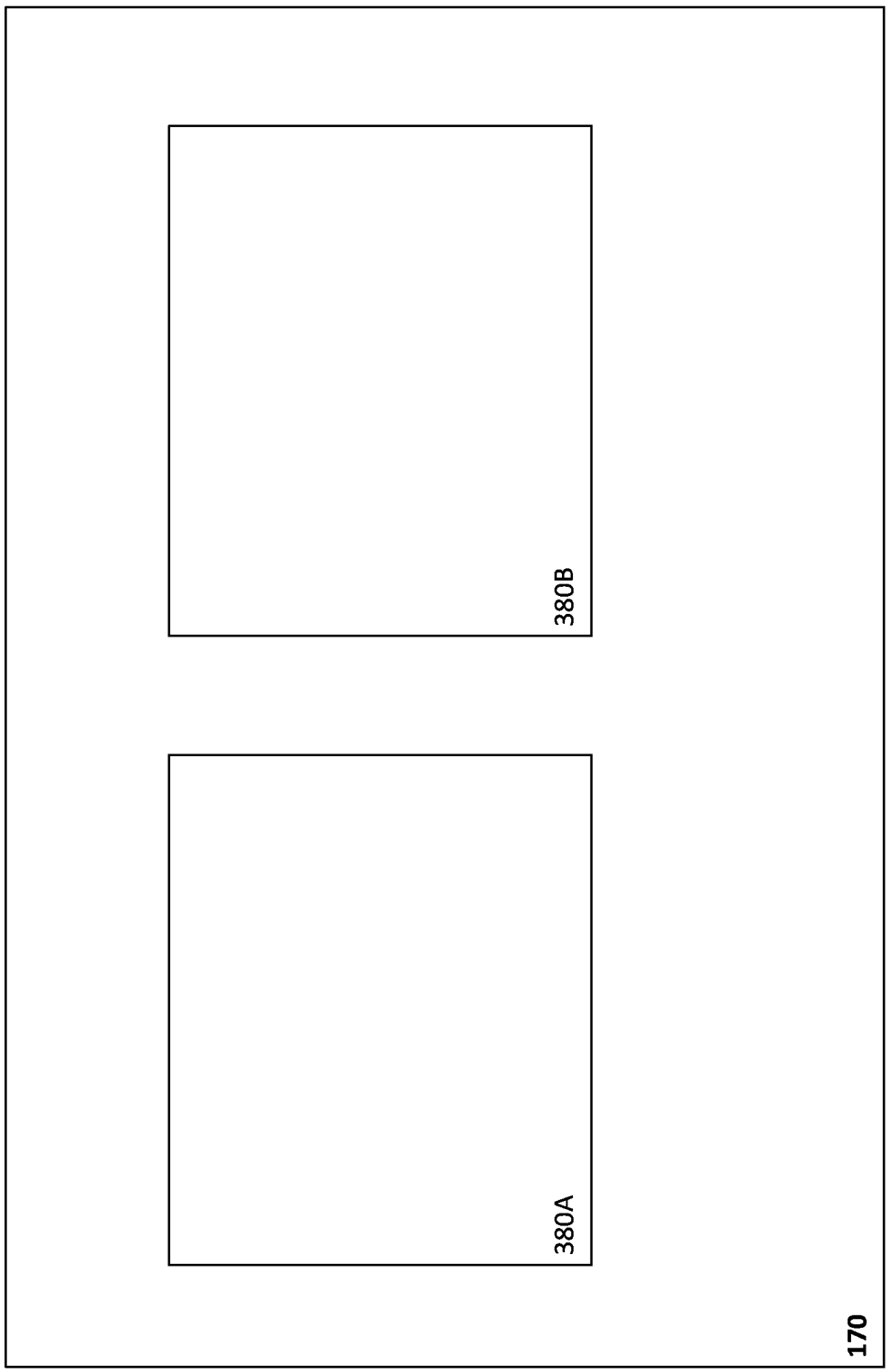
FIG. 3 is an example architecture of a graphics processing unit in accordance with aspects of the disclosure.

FIG. 3 illustrates an example architecture of a GPU 170. The GPU 170 may include one or more processors 380A and 380B. The one or more processors 380A and 380B may be configured to perform parallel and/or independent processing of instructions. In this regard, the processors may operate in coordination to perform massively parallel processing tasks. Although only two processors are shown, the GPU 170 may include any number of processors, including only a single processor.

Figure 4:
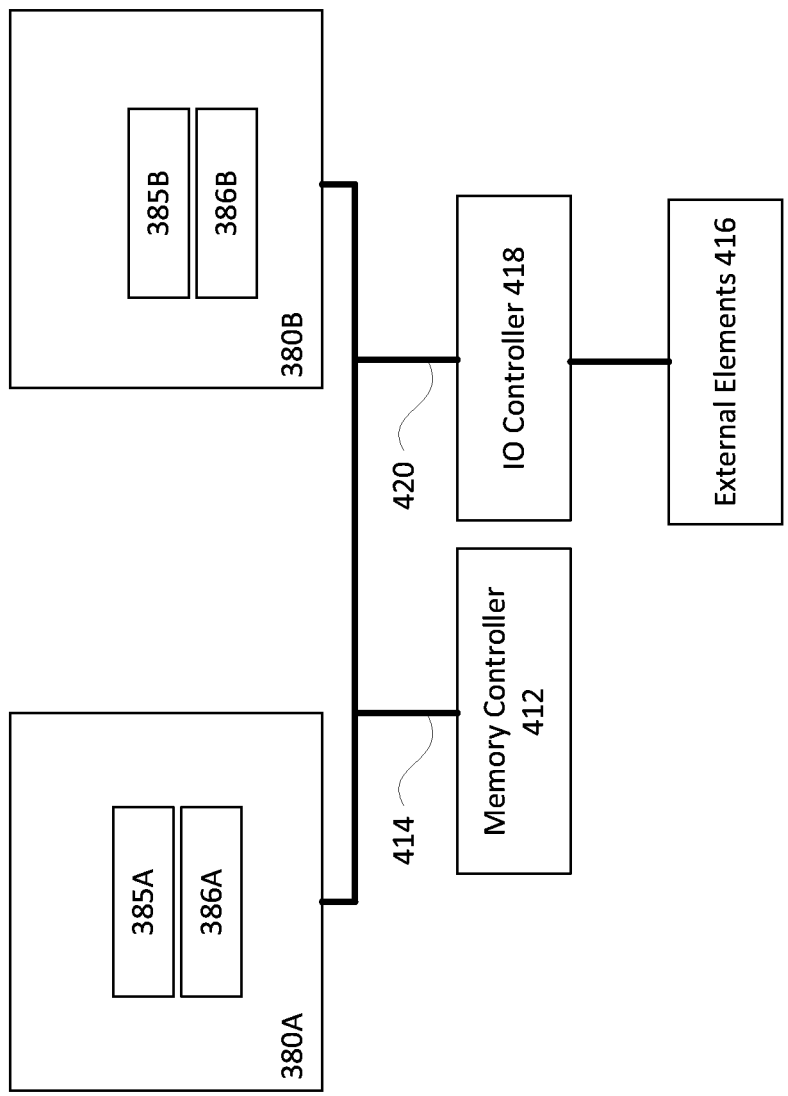
FIG. 4 is an example memory configuration in accordance with aspects of the disclosure.

As shown in FIG. 4, each processor 380A and 380B may include register memory 385A and 385B and shared memory 386A and 386B, respectively. Register memory 385A and 385B is generally memory having high bandwidth and low latency. Register memory is accessible by the processor to which it is associated. For instance, processor 380B may be able to access register 385B, but not register 385A. Similarly, processor 380A may be able to access register 385A, but not register 385B.

Shared memory 386A and 386B may allow data to be shared between the processors. Each shared memory may interact with the register memory of its respective processor to store and/or transfer data from the register. For instance, processor 380A may copy and/or move data from register 385A to shared memory 386A to open up memory space for further storage in the register 385A. Further, processor 380B may access the data from shared memory 386A. Although not shown, each processor may include other memory such as constants memory, indexable shared memory, global device memory (i.e., memory accessible by one or more data-parallel devices, such as GPU's, which share an interconnect, which is typically larger than register or shared memory) local memory, stack memory, parameter memory, and texture memory.

A memory controller 412 may coordinate the transfer of data between processors. For instance, processor 380B may request data from shared memory 386A through memory controller 412. In this regard, processor 380B may communicate via a high-speed, low latency memory bus 414. Memory controller 412 may then cause shared memory 386A to transfer the requested data, via the memory bus 414, to shared memory 386B. In some embodiments, the processors may communicate directly without the need for a memory controller 412. The CPU and GPU may have a separate or unified memory architecture. A separate memory architecture, also known as a discrete memory system as shown in FIGS. 3 and 4, may be comprised of the CPU 112 and GPU 113 having their own discrete memories. In order to transfer data between the CPU and GPU memories, a bus, such as memory bus 414, may be utilized, as shown in FIG. 3A. In a unified memory device the CPU and GPU may share caches and provide memory coherency across its processing elements. For instance, as shown in FIG. 3B, the CPU 112 and GPU 113 share a memory interface comprising a local level cache 115 and dynamic random access memory 117.

Each processor 380A and 380B may request data from external elements 416 via an IO bus 420. In this regard, when a processor, such as processor 380A requests data not currently stored in a shared memory and/or register memory, the processor 380A may request the data from the IO controller 418. The IO controller may locate and retrieve the requested data from the external element 416, such as storage device 150, and supply the data to the processor 380A.

Figure 5:
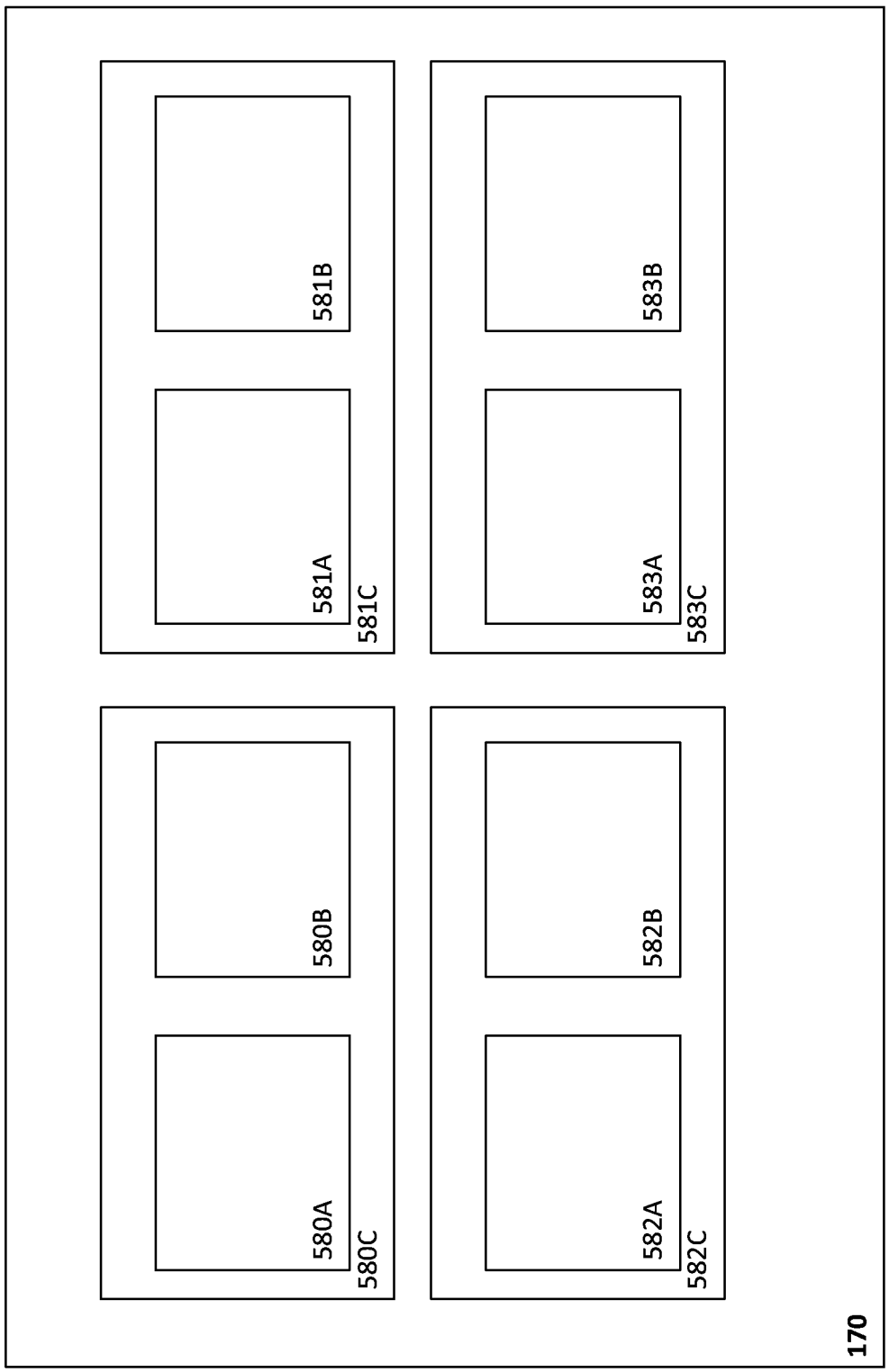
FIG. 5 is an illustration of processor groups within a graphics processing unit in accordance with aspects of the disclosure.

Turning to FIG. 5, the GPU 170 may include groups of processors which may form processor groups. For example, processors 580A and 580B may form processor group 580C, processors 581A and 581B may form processor group 581C, processors 582A and 582B may form processor group 582C, and processors 583A and 583B may form processor group 583C. Each processor in a processor group may share memory and other such elements with other processors in the processor group. For instance, processors 580A and 580B of processor group 580C may share one or more register memories and shared memories. Each group of processors may be controlled by the same instruction at any point in time. Processor groups which are controlled by the same instruction may be referred to as a "warp", "wavefront", SIMD operation or a very long instruction word (VLIW) operation.

A collection of processor groups may be referred to as a block of processors. Communication and coordination between processor groups may be accomplished through memory and control flow fencing operators or atomic memory operations. A block of processors does not necessarily have a processor group collection size that is a power of two.

Similarly, a collection of a block of processors may be referred to as a grid. Coordination between the blocks of processors in a grid may be accomplished through memory and control flow fencing operators or atomic memory operations.

Example Methods

Figure 6A:
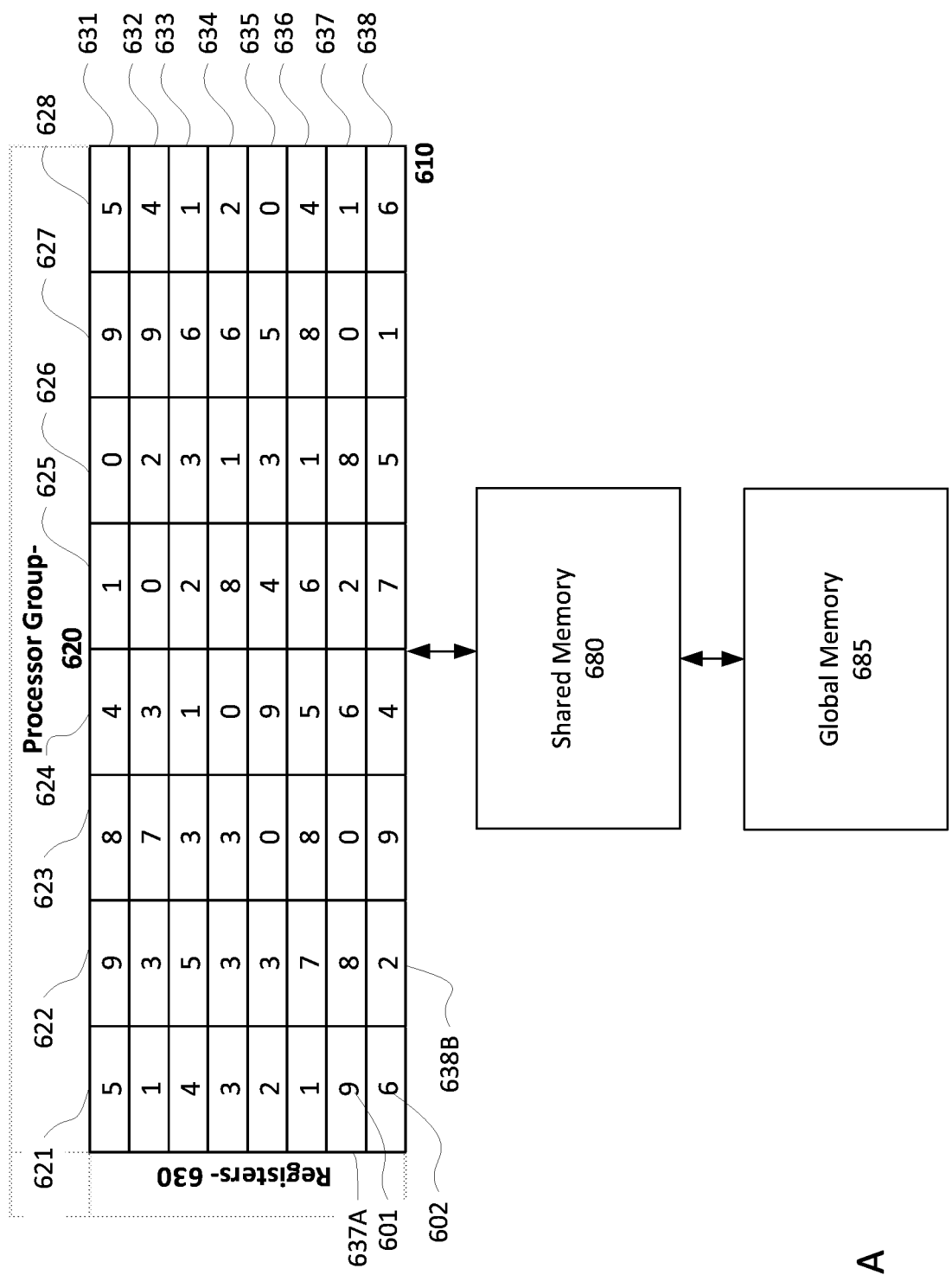
FIG. 6A is an example of a set of elements loaded into a slab in accordance with aspects of the disclosure.

To sort data elements on data-parallel computing device, such as GPU 170, the data elements may be loaded into a slab corresponding to one or more processors groups, each comprising two or more processors. In this regard, each processor in the processor group may load an optimal number of unsorted data elements from a memory region to a processor-visible memory region, such as registers. For instance, a processor group 620 may load data elements from shared memory 680 or global memory 685 to a slab 610, as shown in FIG. 6A. To initiate the loading of data elements, a slab load kernel, which defines and causes a computing device to execute load instructions as defined herein, may be executed by the GPU 170.

The size of the slab may be defined by the number of processors in a processor group and the number of registers. For example, slab 610 is defined by processors 621-628 in processor group 620, illustrated as columns in the chart of FIG. 6A. Each processor may store a data element in a register row 631-638 of the registers 630, illustrated as rows in the chart of FIG. 6A. For instance, processor 621 may store data element 601 in register row 637 and processor 622 may store data element 602 in register row 638. Processors may only be able to access (i.e., read and/or write) a single register in a register row. For instance, processor 621 may only be able to access register 637A in register row 637 and processor 622 may only be able to access register 638B in register row 638.

Figure 6B:
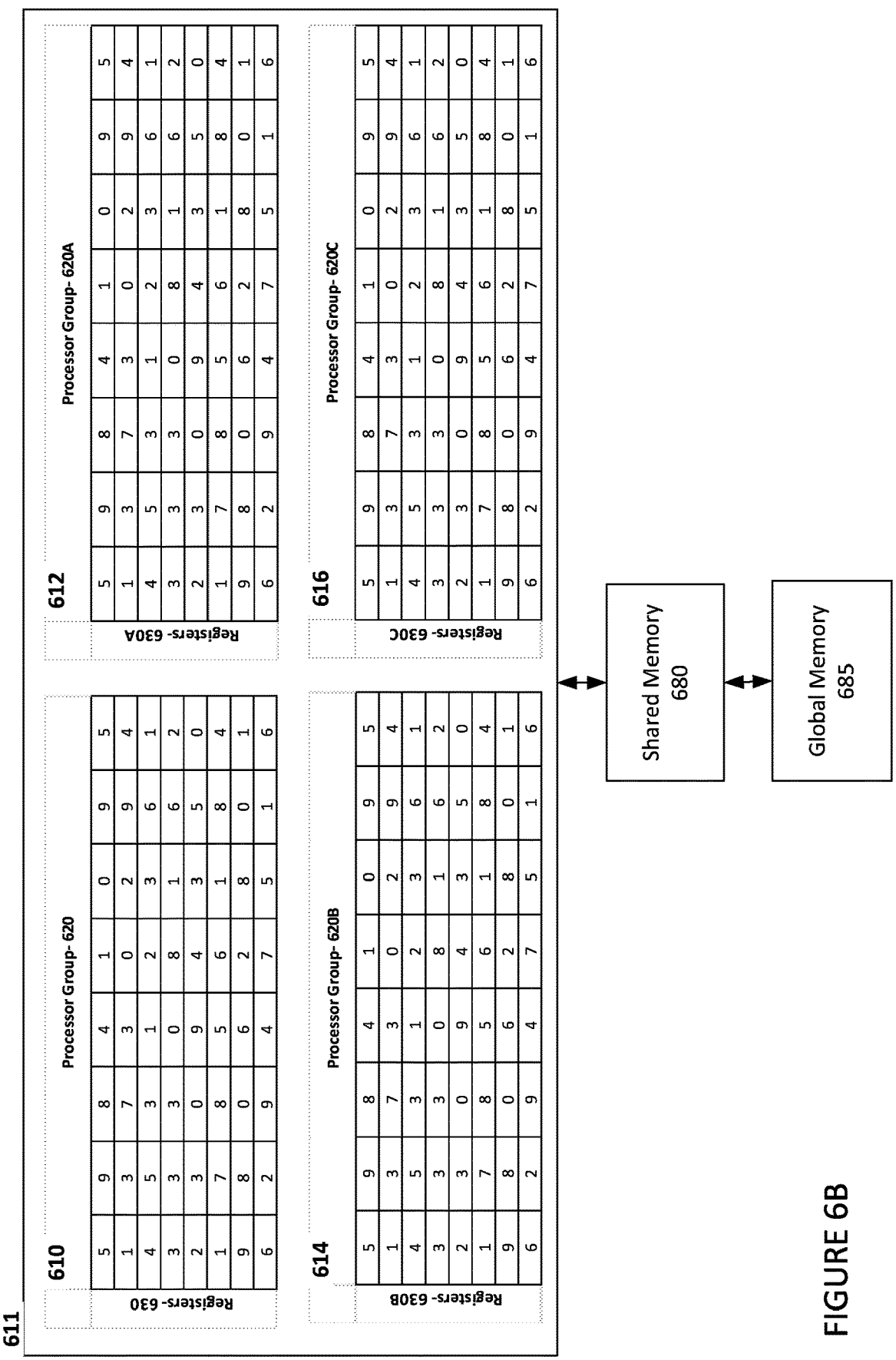
FIG. 6B is an example block of processors in accordance with aspects of the disclosure.

In some instances, data elements may be loaded into slabs simultaneously. For instance, data elements may be loaded into slabs 610-616, as shown in FIG. 6B. In this regard, processor group 620 may load a first set of data elements into its respective registers 630 to generate slab 610. Similarly, processors 620A-620C may load a second, third, and fourth set of data elements into registers 630A-630C, respectively, to generate slabs 612-616. The generation of slabs 610-616 may occur simultaneously. Although FIG. 6B shows four slabs, any number of slabs may be generated simultaneously or concurrently. As further shown in FIG. 6B, processor groups 620-620C form a block of processors 611, with each processor group of the block accessing the same or different shared memory 680. Although only four processor groups are shown as forming block 611, any number of processor groups may form a block and each block may contain more than one slab.

Figure 6C:
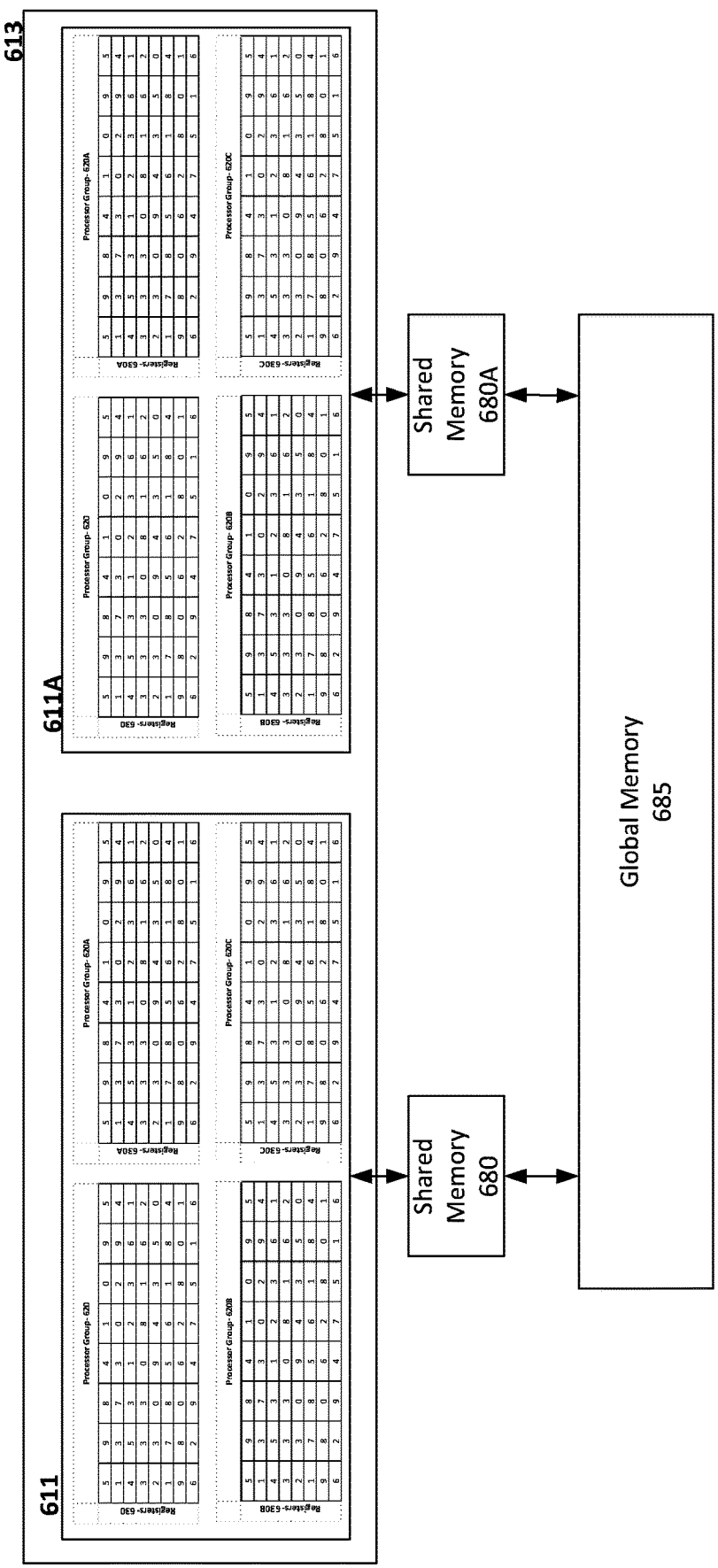
FIG. 6C is an example of a grid of blocks of processors in accordance with aspects of the disclosure.

A collection of a block of processors, such as block of processors 611 and 611A may be referred to as a grid. For instance, block of processors 611 and 611A, in FIG. 6C may be grouped together as a grid 613. Coordination between the blocks of processors in a grid may be accomplished through memory and control flow fencing operators or atomic memory operations. For example, block of processors 611 may communicate with block of processors 611A through with global memory 685 directly, or through shared memory 680, as further shown in FIG. 6C.

The data elements may be loaded into the slab in a transposed order. In this regard, an optimal number of data elements may be transposed and loaded into each processor's respective registers. The optimal number of data elements may be determined by the size of the data-parallel computing device's register file, such as 32×256, 8×128, or more or less. For instance, GPU 170 may include a register file of 32-bit registers that is 32×256 and may be sorting 32-bit keys, such that the slab width is the same as the width of the GPU's register file. As such, the maximum slab height may be somewhat lower than the register file height, such as 200, or more or less, since the data elements being sorted remain in the register file until sorted (or merged) and empty registers may be used for temporary variables, etc. during processing, sorting, merging, etc.

For instance, data elements may be loaded into registers associated with processor 621, then processor 622, etc., until all registers in the slab 610 are filled, as shown in FIG. 6A. By doing such, the sorting or merging of data elements in the slab may be run sequentially within a single processor, simplifying the sorting of the data elements, as discussed herein.

By loading data elements in a transposed order into the registers of single processors, neither inter-processor communication nor processor rank comparison operations need to be performed when loading or sorting data elements. By way of example, a direct implementation of a sorting or merging network on a data-parallel computing device, such as GPU 170, may include mapping each data element to a ranked set of processors in the processor group. In this regard, compare-and-exchange operations may be performed by a routine that takes the value held by this processor, obtains a value from another predetermined processor and if the current processor is lower-ranked, the lesser value is kept. Otherwise, the greater value is kept, as shown in the below algorithm, where input0 and input1 are first and second data elements:

```
COMPAREEXCHANGE(INPUT0,INPUT1,
  ISGREATERPROCESSOR)
IF (ISGREATERPROCESSOR)
  INPUT0 = MAX(INPUT0,INPUT1)
ELSE
  INPUT0 = MIN(INPUT0,INPUT1)
```

The inefficiencies found in this approach are numerous. Initially, two processors are needed to sort two data elements. As such, each processor must perform at least one comparison to determine the lesser or greater data element value depending the processor's rank. Furthermore, inter-processor communication must occur through either memory shared by both processors or through another means of inter-processor communication.

Sorting transposed data elements within a slab may be performed sequentially within a single processor, with each processor sort the data elements in its respective registers simultaneously. Such sorting may be performed using a sorting network. Sorting networks may be mathematical models which describe a predetermined sequence of compare-and-exchange operations that will transform an unsorted list of data elements into a sorted list. For instance, sorting of the data elements may be iteratively performed using the following sorting network algorithm (algorithm 1), where input0 and input1 are first and second data elements.

ALGORITHM 1

```
COMPAREEXCHANGE(INPUT0,INPUT1)
INPUT0 = MIN(INPUT0,INPUT1)
INPUT1 = MAX(INPUT0,INPUT1)
```

Figure 7:
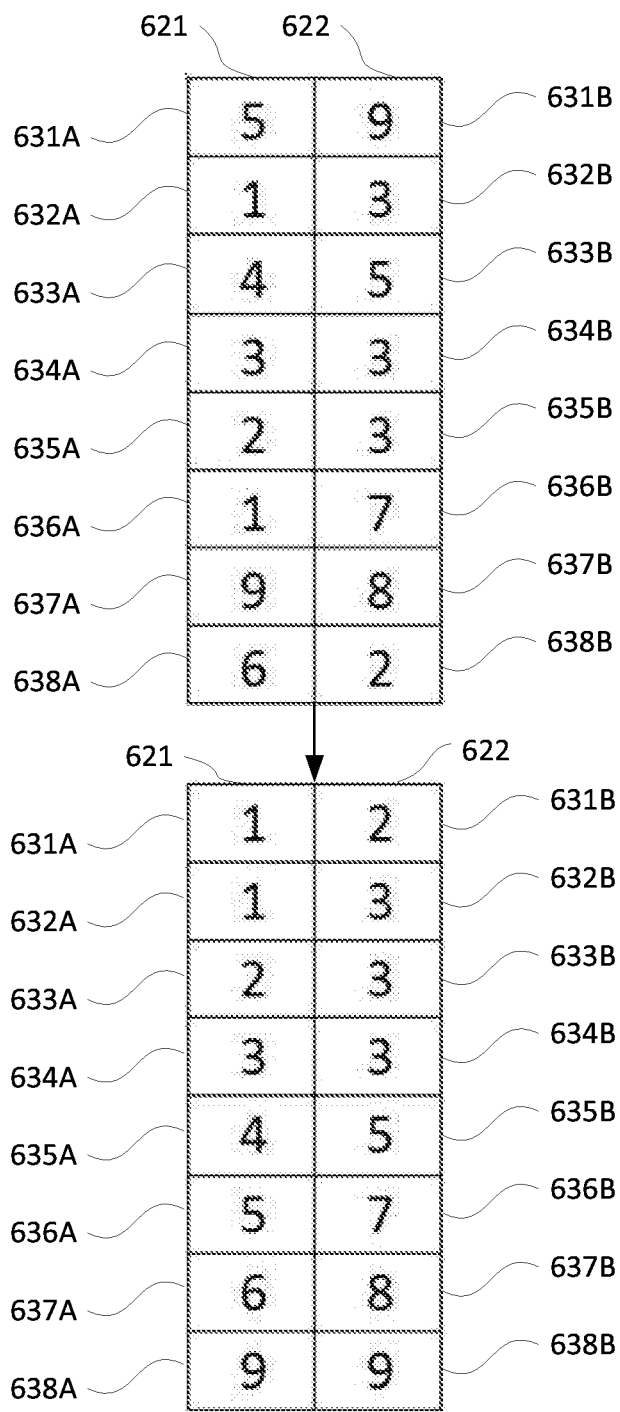
FIG. 7 is an example a slab with sorted processor registers in accordance with aspects of the disclosure.

Referring to FIG. 7, unsorted data elements in registers associated with processor 621 (i.e., 631A-638A) and data elements in registers associated with processor 622 (i.e., 631B-638B) are shown in the top chart. Upon each processor 621 and 622 iteratively performing the above Algorithm 1, data elements stored in the registers associated with each processor may be sorted in descending order, as shown in the lower chart of FIG. 7. One benefit of Algorithm 1 is that the number of comparison operations can be reduced by half, or more or less. Moreover, the number of logical, data movement and other instructions may also be reduced by this algorithm. In the event the processors are superscalar, instruction level parallelism may be exploited using the above algorithm. The sorted data elements of each processor in the processor group are shown in slab 810, in FIG. 8. Although not shown, multiple slabs, such as slabs 610-612 may be sorted simultaneously.

Figure 8:
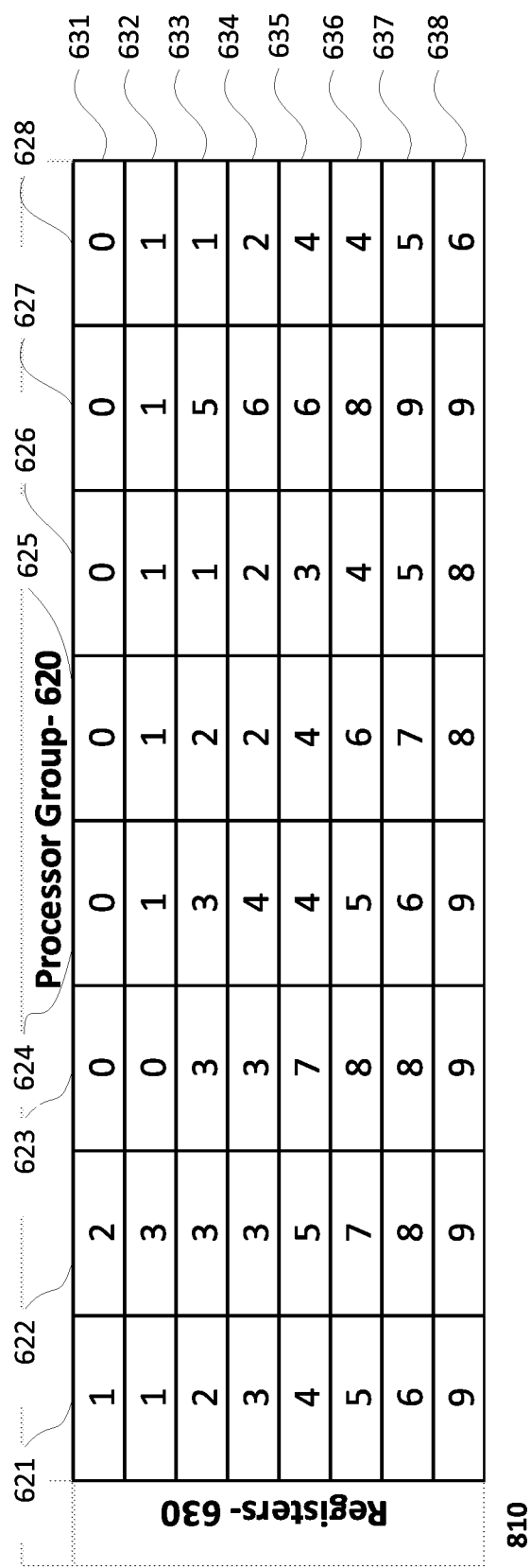
FIG. 8 is an example of a slab with sorted data elements by processor in accordance with aspects of the disclosure.

In the event the register rows are not power of two sized, alternative sorting techniques may be used. For instance, the register rows may be resized to the lowest power of two greater than the register row size and new data elements may be initialized in the register row with minimally or maximally valued data elements. In some instances data-elements may be skipped at indices outside of the original data elements. For example, for slabs of 1024 elements (e.g. 32-bit integers), if there are only 1000 elements to be sorted then the 1000 elements may be "padded" with maximum or minimum value elements before sorting begins. By padding the slab with maximum and/or minimum value elements, these elements may remain at the end of the slab while allowing the sorting to proceed as if there were 1024 keys to sort. Alternatively, all of the kernels which process the sorting and/or merging may be made aware of the original number of data elements and avoid performing explicit loads of the missing data elements, and instead substitute a maximum or minimum value at each step. Upon sorting the data elements of each processor, the sorted data elements of each processor may be merged with the other data elements in the registers of the other processors in the processor group and, subsequently, with the data elements in other processor groups if any are used. In other words, a sorted column of data elements held by a processor in its respective registers, need to be merged with the sorted columns of data elements held by other processors either in the same processor group's slab of data elements, or with coordination, another processor group's slab of data elements. For instance, data elements stored in the registers associated with processor 621 as shown in FIG. 8, may be merged with data elements stored in the column of registers associated with processor 622, further shown in FIG. 8. Processors which are merging sorted data elements together may be considered paired processors.

To merge sorted data elements of the processors together, the rows of registers may be partitioned in a predetermined manner as determined by device hardware or performance characteristics. In this regard, the processing cost of communicating between paired processors can be high depending on the amount of data being shared, as well as the proximity of a processor to its paired merging processor. Moreover, if communication is between processors belonging to different processor groups then synchronization or fencing may be required, adding to the processing cost.

To minimize processing costs, sorted data elements of processor's which are to be merged together may be written to the highest performance memory space available that can be accessed by the paired processors. As the memory space that a processor can access with the highest bandwidth and lowest latency is typically register memory, such as register memory 385A-385B in FIG. 4. However, register memory is usually not accessible by other processors in the device without use of an inter-processor communication mechanism or by storing data elements to shared memory for subsequent loading. Thus, the processors may write the sorted data elements into shared memory, such as shared memory 680, which is accessible by some or all of the processors.

Figure 9:
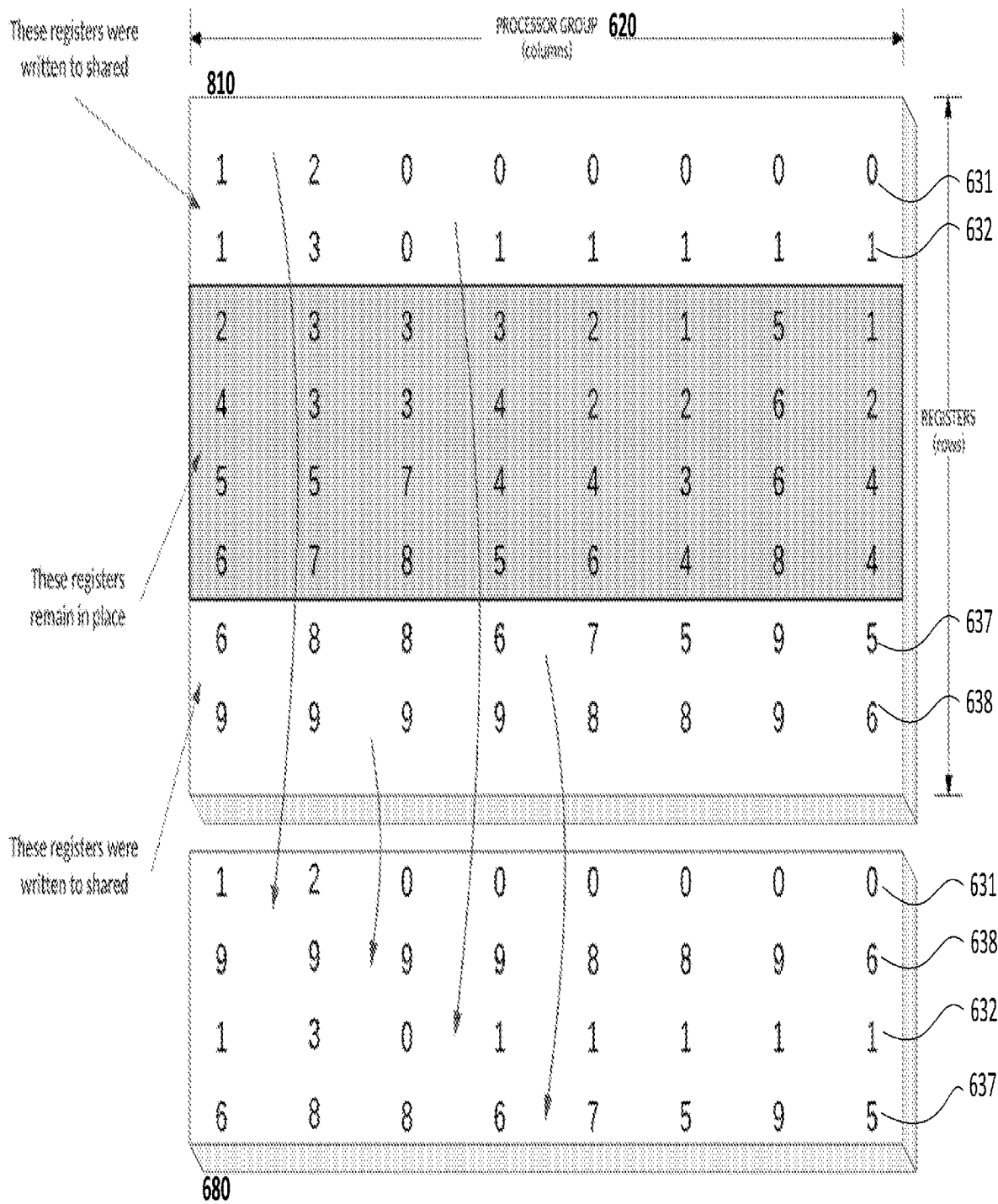
FIGS. 9-11 are examples of merging and sorting data elements through shared memory in accordance with aspects of the disclosure.

For instance, as shown in FIG. 9, the processors in processor group 620 may share selected rows of registers in slab 810. In this regard, selected register rows, including register rows 631, 632, 637, and 638 may be written into the shared memory 680 by each processor in the processor group 620, as further shown in FIG. 9. The determination of register rows to share and when, is described in Algorithm 2, below.

Figure 10:
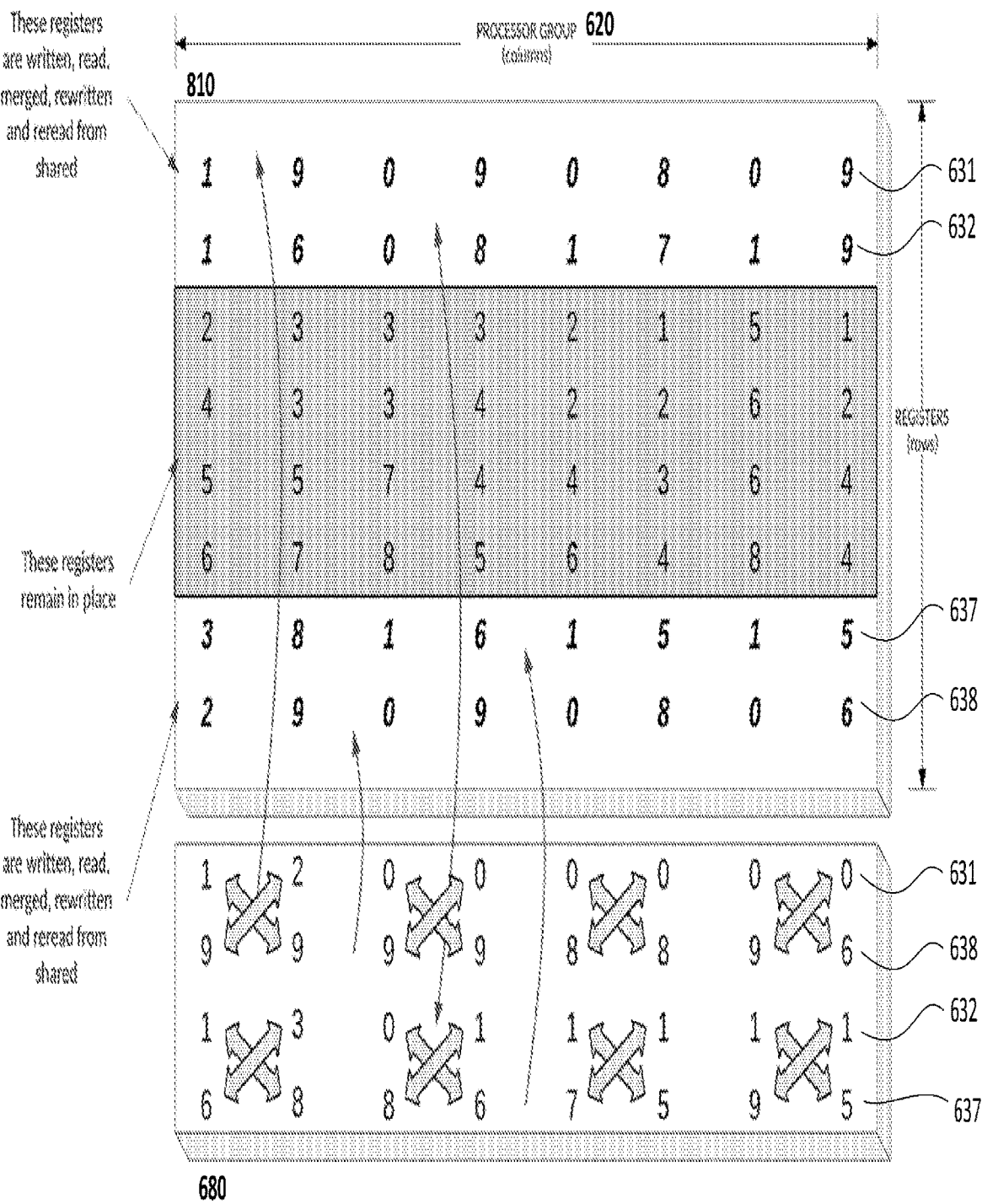

Based on a merge level (i.e., the number of data elements being merged that upon completion will be in sorted order) a processor or processors in the processor group 620 may load a subset of the shared rows in transposed form, thereby replacing the shared subset of register rows. For instance, as shown in FIG. 10 data elements shared from register rows 631 and 638 may be transposed and data elements shared from register rows 632 and 637 may be transposed.

The transposed data elements may be merged sequentially using an optimal merging network. In this regard, the optimal merging network may be a known sorting network optimized for certain sized number of data elements and/or slabs. In some events, an algorithm which generates an efficient sorting network having $O(n \log(n)^2)$ serial complexity, with n being the number of data elements, may be used to generate an optimal merging network.

Each processor may share its merged results with processors in its processor group or, with coordination, other processors groups or devices and each processor may restore the rows that were shared with neighboring processing elements. For instance, the transposed and merged values may be written back into the slab 810, as further shown in FIG. 10.

Figure 11:
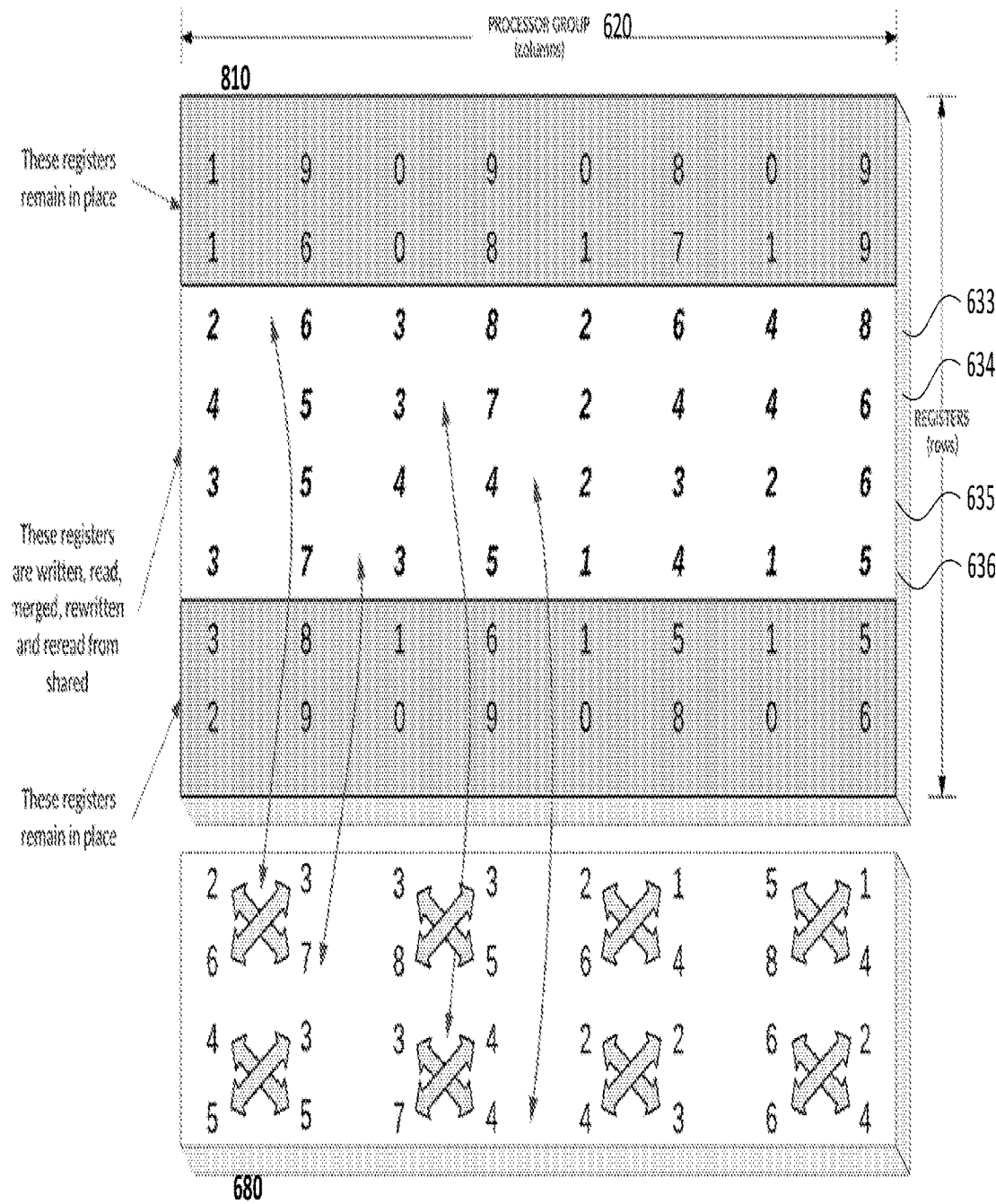

The sharing and merging of register rows may be performed until all rows have been merged. For instance, as shown in FIG. 11, the data elements in register rows 633-636 may be shared from the slab 810 to shared memory 680. The data elements of the shared register rows may then be transposed, merged, and restored, as described above with regard to the FIGS. 9 and 10.

In the event the number of sorted data elements being held in registers by the processors is greater than the number of data elements that can be held in shared memory by all paired processors, inter-processor communication and coordination operations may be used. Inter-processor communication and coordination operations may include determining the maximum number of data elements each processor can write to shared memory (NSK) and the total number of registers per processor M. The larger the magnitude of M the more sequential non-divergent sorting and merging operations can be performed by a single processor without coordination with other processors.

To determine the total number of steps in the merging process (SB), registers per processor M may be divided by NSK. The quotient of the division step may provide the number of steps there are in the merging process (SB). In the event the division of M by NSK results in a non-zero remainder, an additional merging step using only a portion of the processors involved in earlier merging steps may occur.

The aforementioned merging steps may be performed using the following merging algorithm (Algorithm 2) by the data-parallel computing device.

ALGORITHM 2

1. Determine the number of SB steps, as outlined above.
2. Consider the register rows in the following order: { 0, M−1, 1, M−2, 2, M−3, ... , M÷2−1, M÷2 }
3. For each step i in SB : { 0, 1, ..., SB−1 }
   3.1. For NSK register rows from the register row list above: { i×NSK+0, i×NSK+1, ..., i×NSK+NSK−1 }
      3.1.1. Write register rows to shared memory.
      3.1.2. Based on the merging level (i.e., The number of data elements being merged that, upon completion, will be in sorted order. "LEVEL") and the register index { 0, 1, ..., NSK−1 }, read back data elements from even rows using the LEFT calculation and from odd rows with the RIGHT calculation into the same register rows that were written to shared. Half of the registers are termed "left" registers and the other half are "right". The variable n has the range { 0, 1, ..., NSK÷2−1 } .
        LEFT(N): ((LEVEL × ((N) / (LEVEL÷2))) + ((N) % (LEVEL÷2)))
        RIGHT(N): ((LEVEL × ((N) / (LEVEL÷2))) − ((N) % (LEVEL÷2)) + LEVEL 1)
      3.1.3. Compare LEFT with RIGHT for n : { 0, 1, ..., NSK/2−1 } then continue with a sequential bitonic merge on the left registers and then right registers.
      3.1.4. Based on the merging level LEVEL and the register index { 0, 1, ..., NSK−1 }, write back data elements to their original locations they were read from in 3.1.2.
      3.1.5. Read back data elements from shared memory using same locations in 3.1.1.
   3.2. Continue to next step i+1 in SB : { 0, 1, ..., SB−1 }

Figure 12:
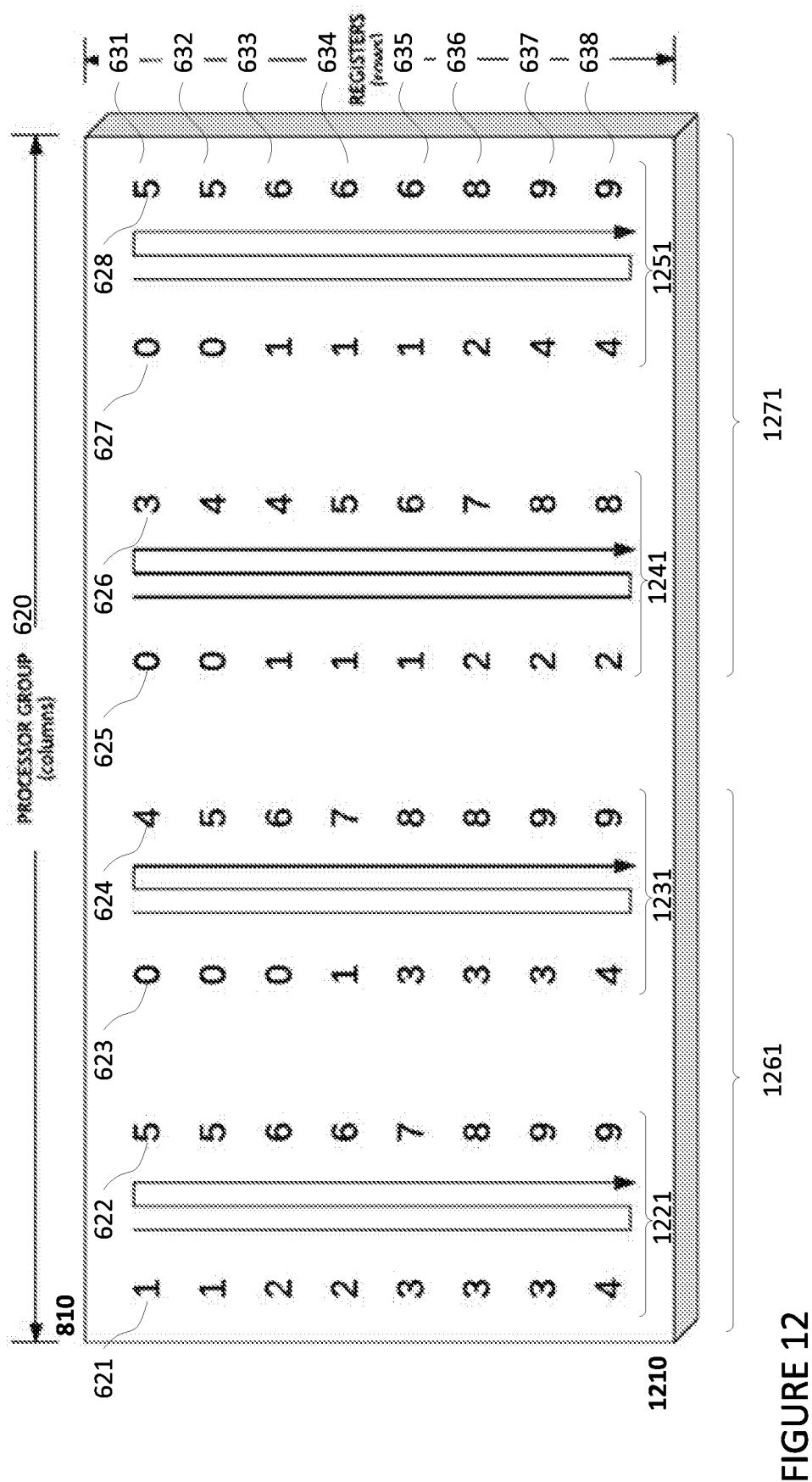
FIG. 12 is an example of a partially sorted slab in accordance with aspects of the disclosure.
Figure 13:
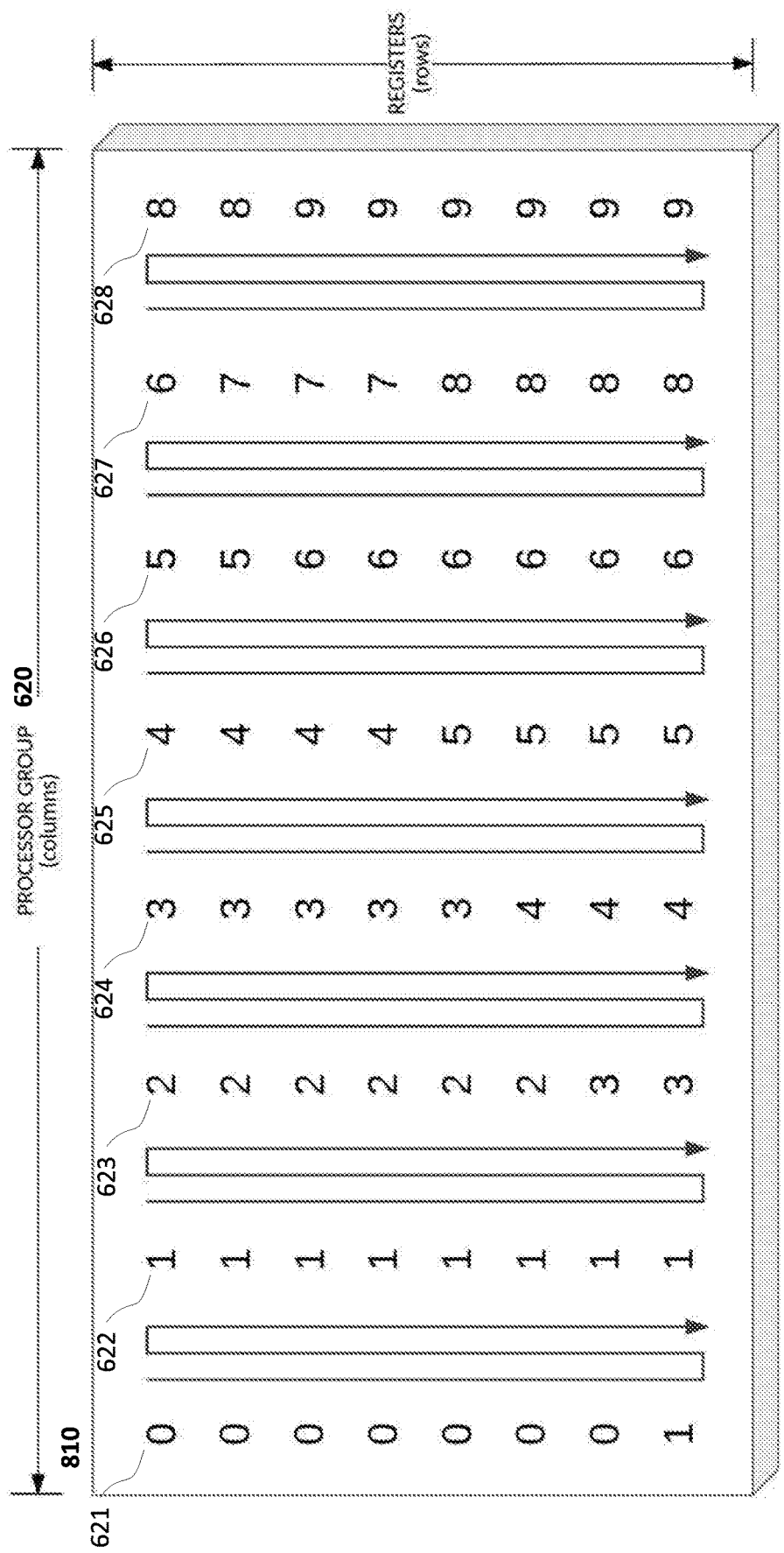
FIG. 13 is an example of a sorted slab in accordance with aspects of the disclosure.

Upon merging all of the register rows, each processor column (i.e., 621-628) may be bitonic but unsorted. Thus, the processors may merge its respective data elements sequentially using a bitonic merging network. For instance, as shown in FIG. 12, processor pairs 621/622, 623/624, 625/626, and 627/628 may sequentially merge their respective data elements 1221-1251 to generate a serpentine pattern within the slab 1210. In other words, FIG. 12 illustrates the result of processor group 620 executing Algorithm 2 a single time. Figure In the event more data elements are to be sorted, (e.g., portions of the slab remain unsorted) Algorithm 2 may be repeated with a doubled merging level until the desired merging level has been reached or until the entire processor group is sorted. In other words, the pairing of processors may be doubled. For instance, processor pairs (i) 621/622 and 623/624; and (ii) 625/626 and 627/628 may themselves be paired together to generate processor pairing 1261 and 1271, respectively, as further shown in FIG. 12. The data elements of the processor pairings may be sorted and further pairings may be generated until the entire slab 810 is merged and sorted, as shown in FIG. 13. Algorithm 2 may be implemented for multiple slabs simultaneously. For instance, slabs 610-616, of FIG. 6B may all be processed in accordance with Algorithm 2 simultaneously, by processor groups 620-620C, respectively. The process of merging and sorting, as described above with regard to Algorithm 2 may be initiated and executed through a slab sort kernel and may be referred to as a slab flip merge.

Upon completing the merge, each processor stores the now sorted data elements from its processor-visible memory region to the originating memory region (i.e., registers) in the transposed order. In this regard, the data elements are stored in a slab with a two-dimensional array having width equal to the size of a processor group and with a height equal to the optimal number of elements that were loaded in step (1). For instance, as shown in FIG. 13, processors 621-628 store the transposed data elements in register rows 631-638 in slab 810. In instances where the merging level is smaller than the slab width will result in the slab being partitioned into grouped columns of sorted data elements. The above merging of data elements across processors in the processor group may be considered a slab sort, which may be initiated and performed upon a slab sort kernel being called by the data-parallel processing device.

In the event more than one slab is being sorted, each slab may be merged together to generate a completely sorted list. In this regard, considerations for blocks and grids of processors must be taken into consideration to reduce processing requirements and coordinate the sorting of the data elements and slabs across processors, processor groups, blocks, and grids. For instance, parallel memory access patterns may be found that are mostly resolvable at compile-time and requires minimal calculation at run-time. A data-parallel device can sort and merge up to a predefined number of slabs (NSPB) in parallel. In other words, a data-parallel device can sort and merge some or all slabs at a processor group (i.e., slab) or block level. NSPB may be hardware dependent.

Further, bank conflicts should be avoided. For merging power of two based sorted slabs, a bitonic sorter can be decomposed into K separate and interleaved bitonic sorters of level N followed by N sorters of level K. Alternatively, or in addition to the bitonic sorter, another parallel memory access pattern may be used that works with an N×K bitonic sorter, avoids some or all bank conflicts and allows inter-processor coordination to be minimized.

To define the access pattern, the following algorithm (Algorithm 3), may be used, where SHCB_BASE and SHCB_OFFSET are functions of the sorting level (known at compile time) the amount of padded shared memory per warp (known at compile time), the warp's id, and the warp lane's id. SHCB_BASE and SHCB_OFFSET spread parallel memory accesses across the number of slabs residing in the data-parallel device as a function of the number of processors in a processor group and the current processor, PRC-GROUP # is a particular processor group, and Processor # is a particular processor in a processor group. All bank conflicts are avoided using this parallel memory access calculation. The interleave factor is determined by the function LNSK which is dependent on the size of the processor group and NSK. Each function in Algorithm 3 is shown in Appendix A.

Algorithm 3

BASE: SHCB_BASE(LEVEL,PROC-GROUP#,PROCESSOR#)
OFFSET: SHCB_OFFSET(LEVEL,PROC-GROUP#,PROCESSOR#)
LEFT: BASE + OFFSET
RIGHT: BASE − OFFSET

Figure 14:
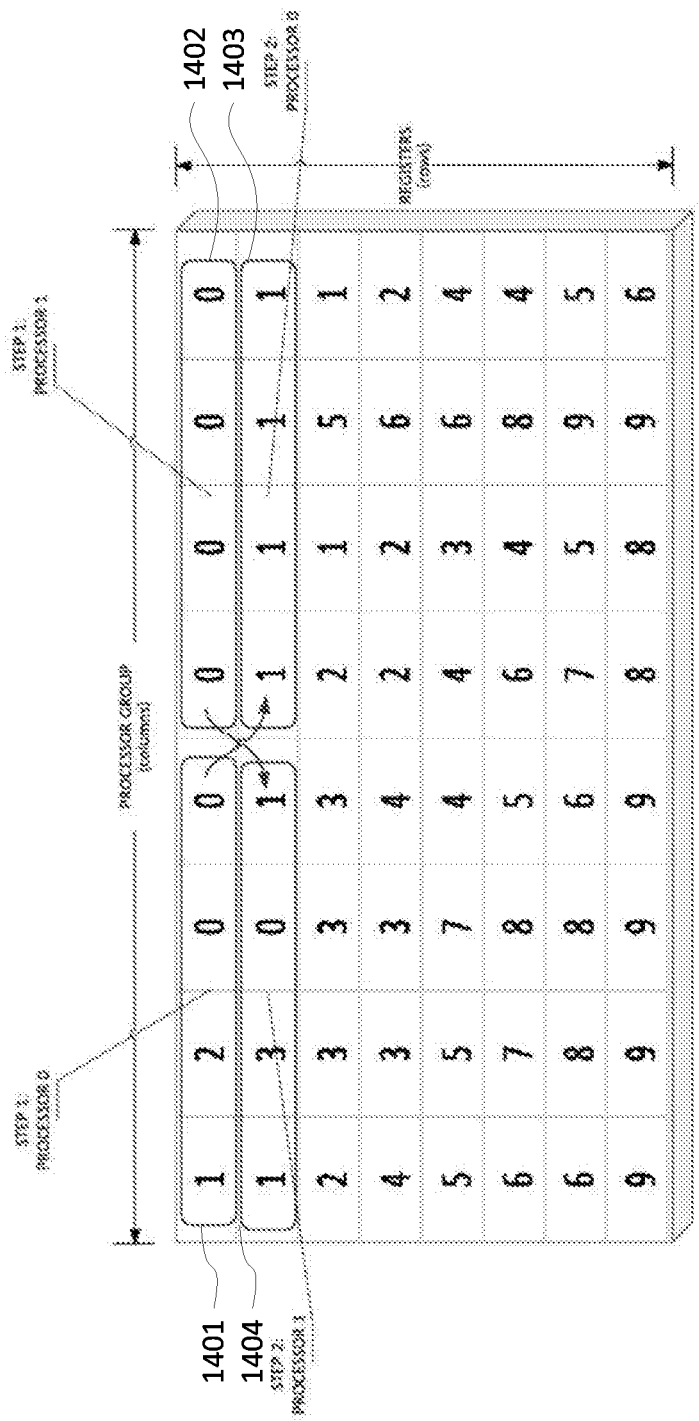
FIG. 14 is an example of a broadcast merge in accordance with aspects of the disclosure.

Referring back to Algorithm 2, the LEFT and RIGHT calculations can be resolved at compile time into load or store from a memory region with a constant offset. The result is that the merging algorithm's parallel memory access pattern is conflict-free, requires minimal computation and minimal logic. For instance, FIG. 14 illustrates how, for NSK=16, indices into shared memory can be statically calculated. In this regard, FIG. 13 shows that half of the left row and half of the right row can be merged at each step. As further shown in FIG. 14, LEFT and RIGHT blocks 1401-1405 refer to registers that are being read from shared memory. The arrows within the LEFT and RIGHT blocks 101-105 represent a lane in the data parallel processor may read from odd and even rows in shared memory. The odd row will be read using the column index provided by the RIGHT(n) function as defined in Algorithm 2. Reversing the rows and repeating the same procedure merges the remaining two halves. Thus in two parallel comparisons two rows can be merged. Furthermore, the pattern computed by LEFT and RIGHT loads registers such that after the inter-row merge is complete the registers may contain those indices that are required by the next merge step(s). The significant benefit is that the merge step(s) can be performed with the without additional loads and stores.

For data-parallel devices which support broadcast loads between processors, extra levels of merging while avoiding duplication of reads from shared memory or use of extra registers may be possible. In this regard, a broadcast read and in-place compare allows up to NSK values to be held in registers which enables up to $\log_2(NSK)$ levels of merging to be performed without additional reads or writes from shared or other memory spaces. For instance, FIG. 14 shows two processors "0" and "1" which, in a first step, read NSK values from their own respective rows i.e., 1401 and 1402. Each processor may sequentially read, in a second step, NSK values from its opposing merger rows, 1403 and 1404, respectively and compare-and-exchange values in-place so no additional registers are required for storage.

In the event the parallel processing device has a total number of processor groups that is not a power of two, optimal performance might be achieved only when all available processor groups and their associated resources are utilized. In this regard, if the number of sorted slabs is not a power of two then a generalized bitonic sorting network, described below, can be used to merge the slab rows. For instance, a bitonic sorting network of any size can be constructed by decomposing it into one or more stages of interleaved odd and even bitonic sorting networks. This decomposition can be applied recursively resulting in successively smaller interleaved odd and even networks. The decomposition can be halted when a desired or primitive network size is obtained. This decomposition process when combined with the slab's serpentine sorted layout enables another method for merging sorted slabs that is efficient and will never result in shared memory bank conflicts.

Generalized bitonic sorting networks, which may also be referred to as generalized sorting networks, may be defined as follows:

1. All logical processor groups have a sorted slab of inputs.
2. The number of logical processor groups may be a multiple of the physical processor groups.
3. For all processor groups in the block:
   3.1. For all stages of the generalized bitonic sorting network:
      3.1.1. If a processor group is active:
         3.1.1.1. Store up to NSK rows in shared memory.
      3.1.2. Activate an optimal number of logical processor groups (usually less than NSK).
      3.1.3. Each activated logical processor group performs the following steps:
         3.1.3.1. Load one or more interleaved odd/even bitonic sorting networks from an NSK row into registers.
         3.1.3.2. Execute the odd/even bitonic sorting networks.
         3.1.3.3. Store the sorted results back to the same location in the NSK row.

Figure 15:
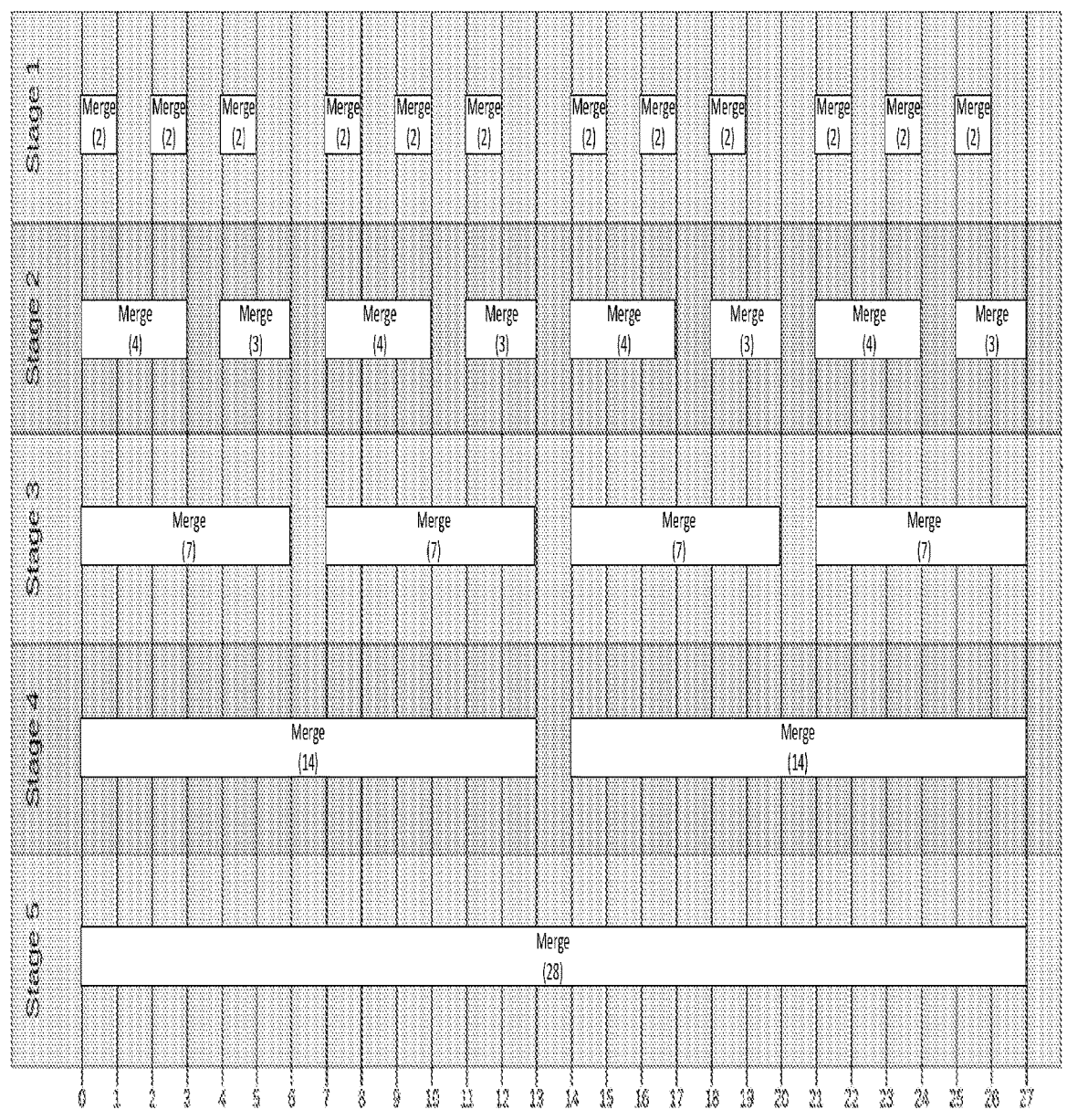
FIG. 15 is an example illustration of a generalized bitonic sorting network in accordance with aspects of the disclosure.

For instance, merging a block of 28 sorted slabs in a processor block can be decomposed into five sequential stages, as shown in FIG. 15. In this regard, FIG. 15 shows:

Stage 1. Merge 12×2-input bitonic sorting networks, leaving 4 inputs inactive.
Stage 2. Merge 4×4-input and 4 3-input bitonic sorting networks.
Stage 3. Merge 4×7-input sorting bitonic networks.
Stage 4. Merge 2×14-input sorting bitonic networks.
Stage 5. Finally, merge a 28 input bitonic sorting network.

All stages, with the exception of the first, may fully utilize the block's logical processor groups. In instances where an optimal number of logical processor groups are activated then the physical processor groups may be fully utilized.

As noted above, bitonic sorting networks have $O(n \log^2 n)$ comparison complexity but very low overhead. For inputs above a certain size, it will be optimal to switch to another sorting algorithm and use the algorithm described in this document to independently sort or merge sequences of inputs below an optimal size with the sorting algorithm described in this document. This may be referred to as a hybrid sorting algorithm.

In the event the number of slabs being merged is a power of two, a multi-slab flip merge may be executed by the parallel processing device, such as GPU 17. The multi-slab flip may occur after completion of each slab in a block of processors being sorted, such as through the slab sort kernel. In this regard, each processor group may load their respective sorted slabs into shared memory in a predefined pattern. The processor groups may then reload their respective slabs with a number of columns from the shared memory. Each processor group may bitonic merge the respective columns of their slabs and again load the slabs to shared memory. Finally, the processor groups may each load their respective slabs with a number of columns from shared memory in a predefined patter and perform a slab half merge, as defined further herein. At the conclusion of the aforementioned steps, each processor group may store a sorted list of data elements in their respective register rows. The multi-slab flip merge may be initiated by the parallel processing device by calling a multi-slab flip merge kernel.

Figure 16A:
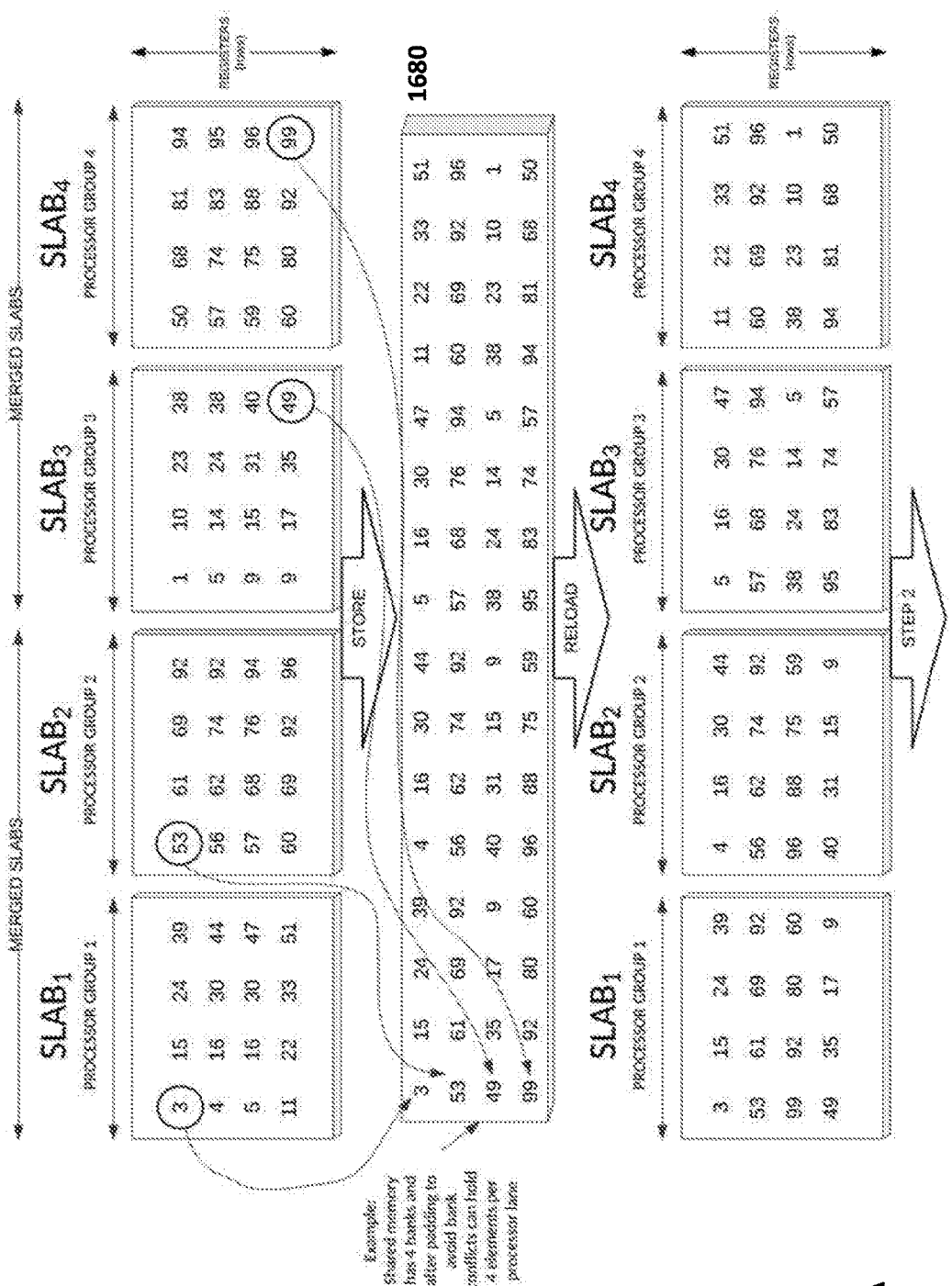
FIGS. 16A-16B are an example flow chart of a multi-slab flip merge in accordance with aspects of the disclosure.
Figure 16B:
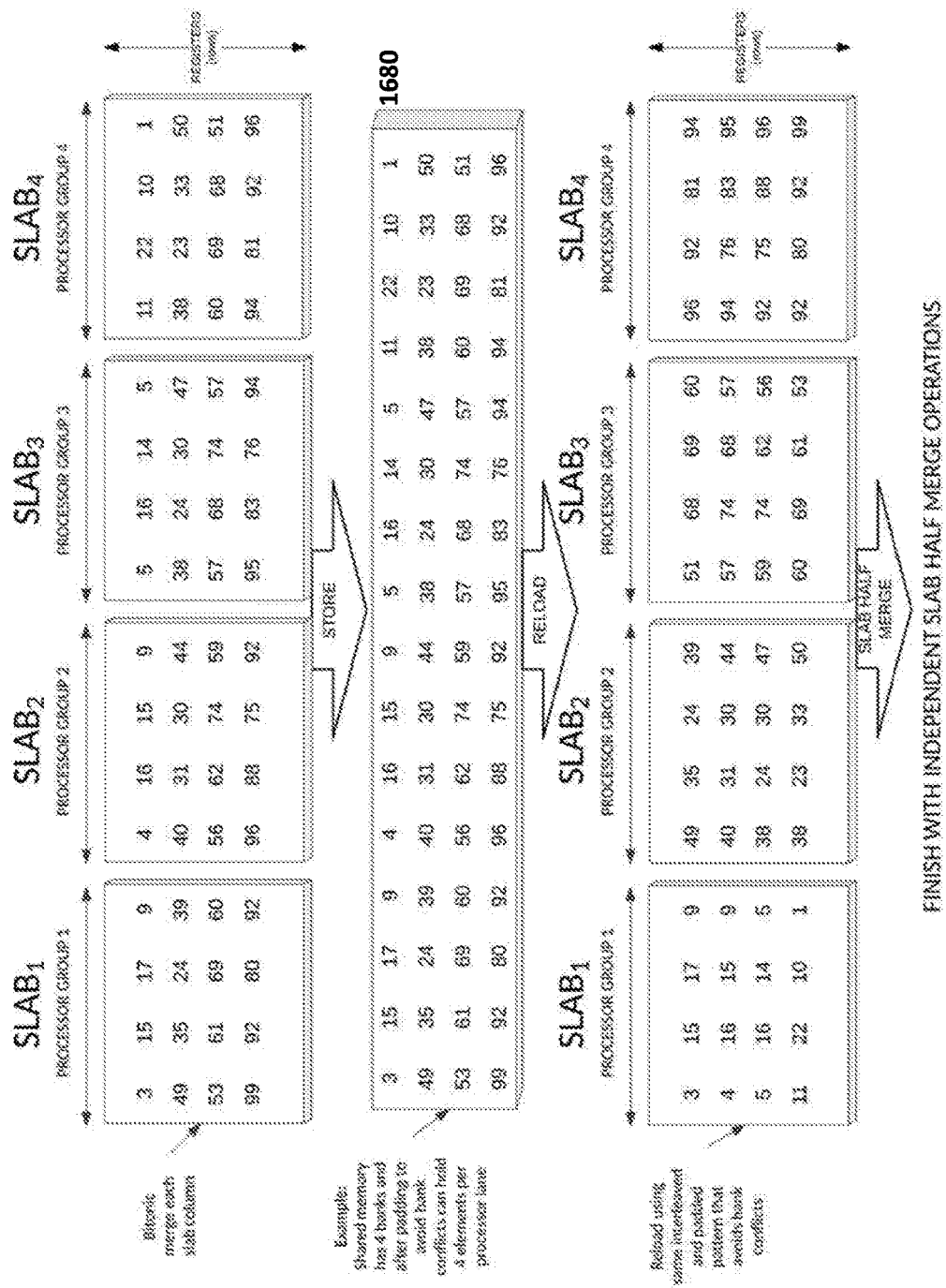

An example multi-slab flip merge is shown in FIGS. 16A-16B. Referring to FIG. 16A, four sorted slabs ($slab_1 \ldots slab_4$) may be stored in the register rows of four processor groups (Processor Group 1-Processor Group 4), respectively. Each processor group may load the data elements stored in their respective sorted slabs into shared memory 1680. Bank conflicts may be avoided while loading the slabs into shared memory by using the techniques described further herein. As shown in FIG. 16A, the first half of the processor groups (i.e., Processor Groups 1 and 2) may add the data elements stored in their respective slabs in a descending order by register row to the shared memory 1680 (e.g., left to right starting from the top left), while the second half of processor groups (i.e., Processor Groups 3 and 4) may add the data elements stored in their respective slabs a reverse and ascending order by register row (e.g., right to left starting from the bottom right). Each processor group may then reload a predefined number of columns (such as four, as shown in FIG. 16A) back into their respective register rows from the shared memory 1680.

Upon each processor group reloading their respective register rows, the processor groups (Processor Group 1-Processor Group 4) may each perform a bitonic merge of each column in respective slab ($slab_1$-$slab_4$), as shown in FIG. 16B. Each processor group may then load the data elements stored in their respective slabs back into shared memory 1680. Bank conflicts may again be avoided while loading the slabs into shared memory by using the techniques described further herein.

Each processor group may again reload a predefined number of rows (such as one, as shown in FIG. 16B) back into their respective register rows from the shared memory 1680. In this regard, the first half of the processor groups (i.e., Processor Groups 1 and 2) may load the data elements from the first and second rows of shared memory 1680, respectively, to their respective register rows in a descending order by register row (e.g., left to right starting from the top left), while the second half of processor groups (i.e., Processor Groups 3 and 4) may add the data elements from the third and further rows of the shared memory 1680, respectively, into their respective register rows in a reverse and ascending order by register row (e.g., right to left starting from the bottom right), where the second half of the processor groups read the shared memory from right to left, as further shown in FIG. 16B. In other words, the first half of the processor groups may load the data elements stored in the top half of rows of the shared memory into slabs in a descending order by register row, while the second half of processor groups may load the bottom half of data elements stored in bottom rows of the shared memory in a reverse and ascending order by register row to complete the multi-slab flip merge. Although FIGS. 16A and 16B show only four processor groups, any number of even processor groups may be used.

Figure 17A:
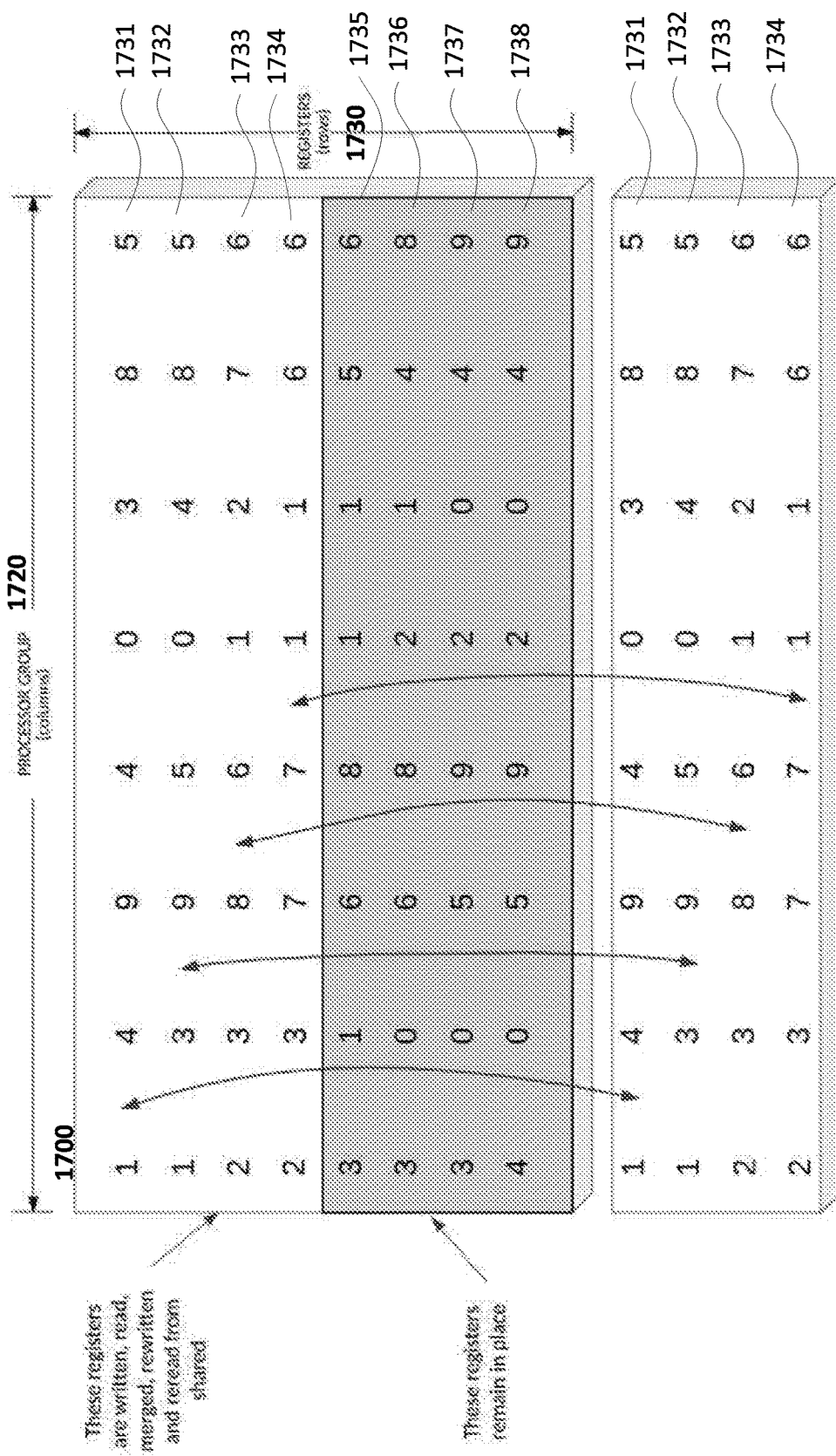
FIGS. 17A-17E are an example illustration of a slab half merge in accordance with aspects of the disclosure.

Upon completing the loading of the slabs, each processor group may perform a slab half merge to sort their respective slabs. The slab half merge may perform a similar function the slab sort described herein, but in a different manner as shown in FIGS. 17A-17E. For example, FIG. 17A shows a slab 1700 stored within a processor group 1720 with eight register rows 1730. The data from the top half of register rows 1731-1734 may be loaded into shared memory 1780 by row, as further shown in FIG. 17A.

Figure 17B:
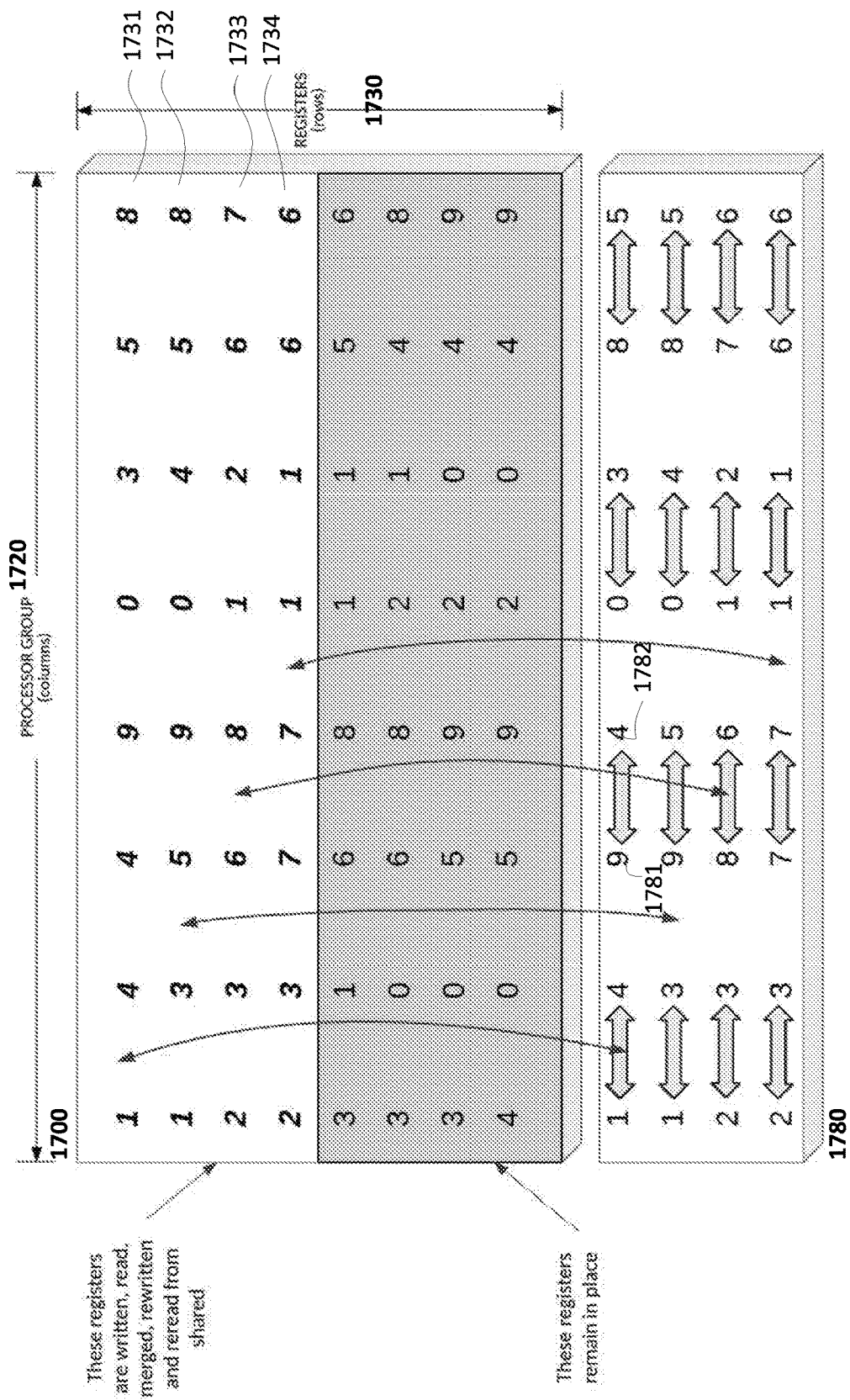

Neighboring data elements loaded into the shared memory may then be compared and exchanged and loaded back into the register rows. For instance, as shown in FIG. 17B, data element 1781 may be compared with neighboring data element 1782. As 9 is greater than 4, the data elements may be exchanged. In other words data elements 1781 and 1782 are swapped. Upon completion of the compare and exchange of all neighboring data elements, the data elements may be loaded back into the slab 1700.

Figure 17C:
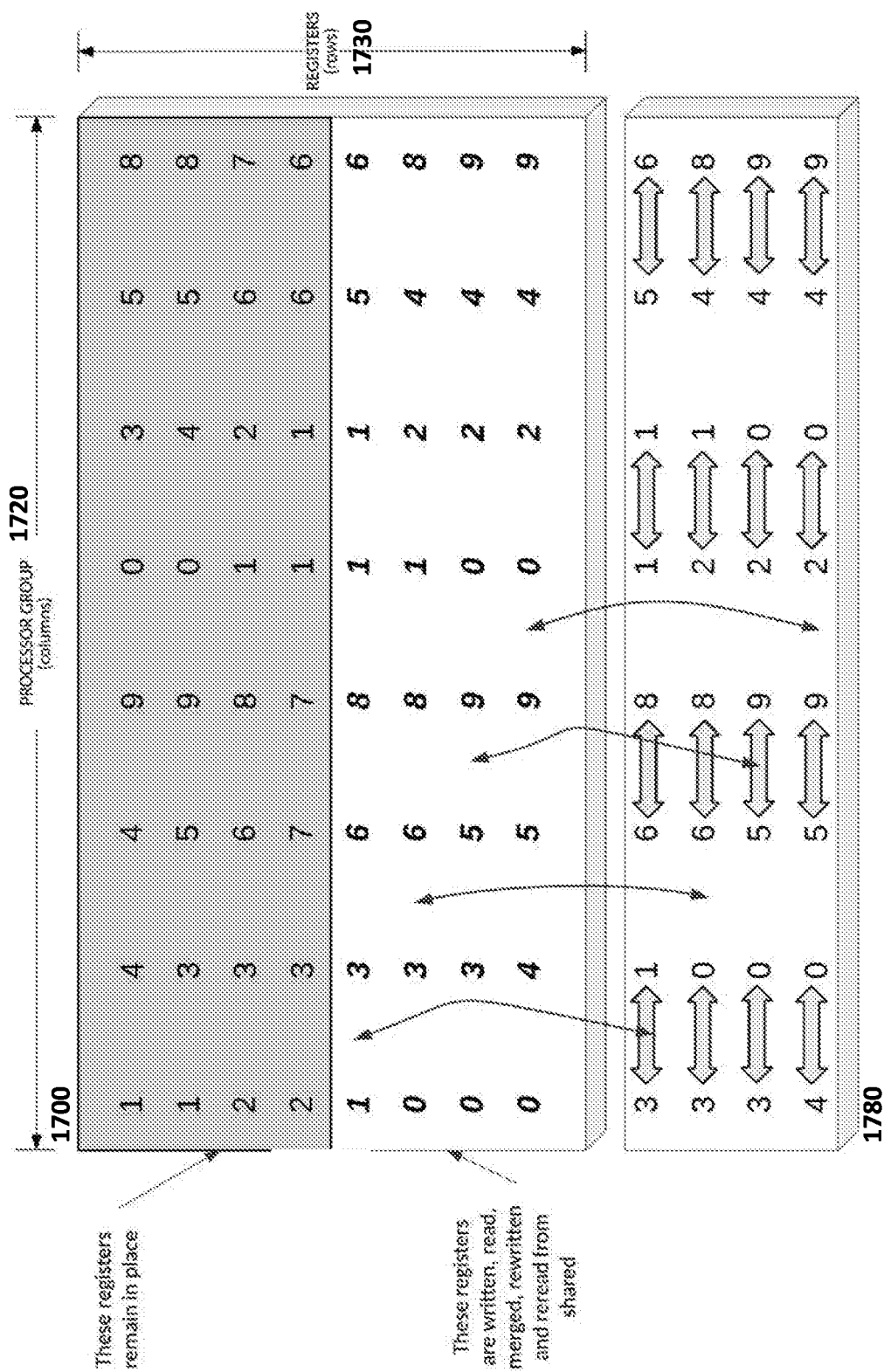

The bottom half of registers in the slab may then be loaded to the shared memory and a compare and exchange of all neighboring data elements may be performed. For example, as shown in FIG. 17C, the data from the bottom half of register rows 1735-1738 may be loaded into shared memory 1780 by row. The data elements in the shared memory 1780 may be reloaded into the slab 1730 upon completion of the compare and exchange of neighboring data elements, as further shown in FIG. 17C.

Figure 17D:
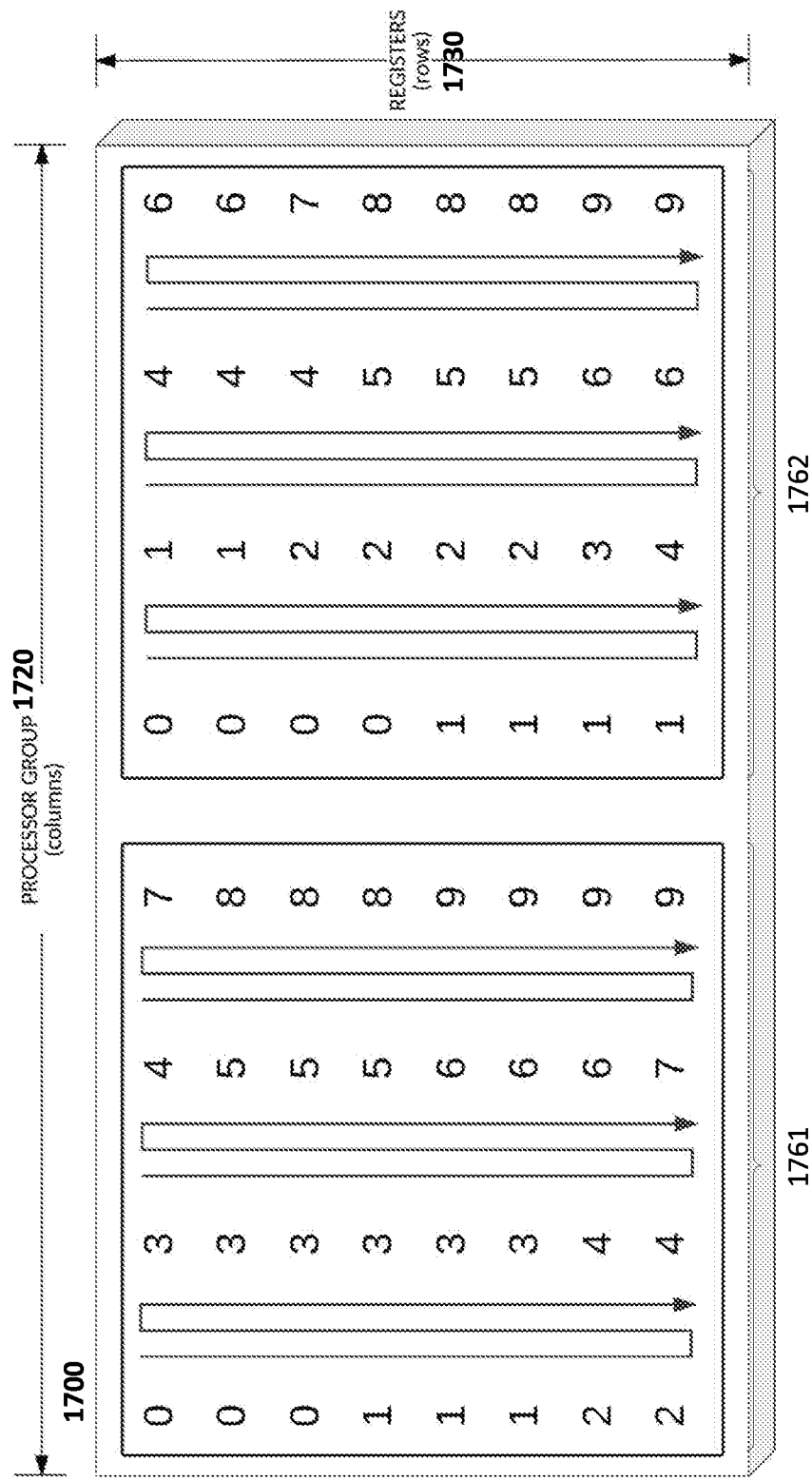
Figure 17E:
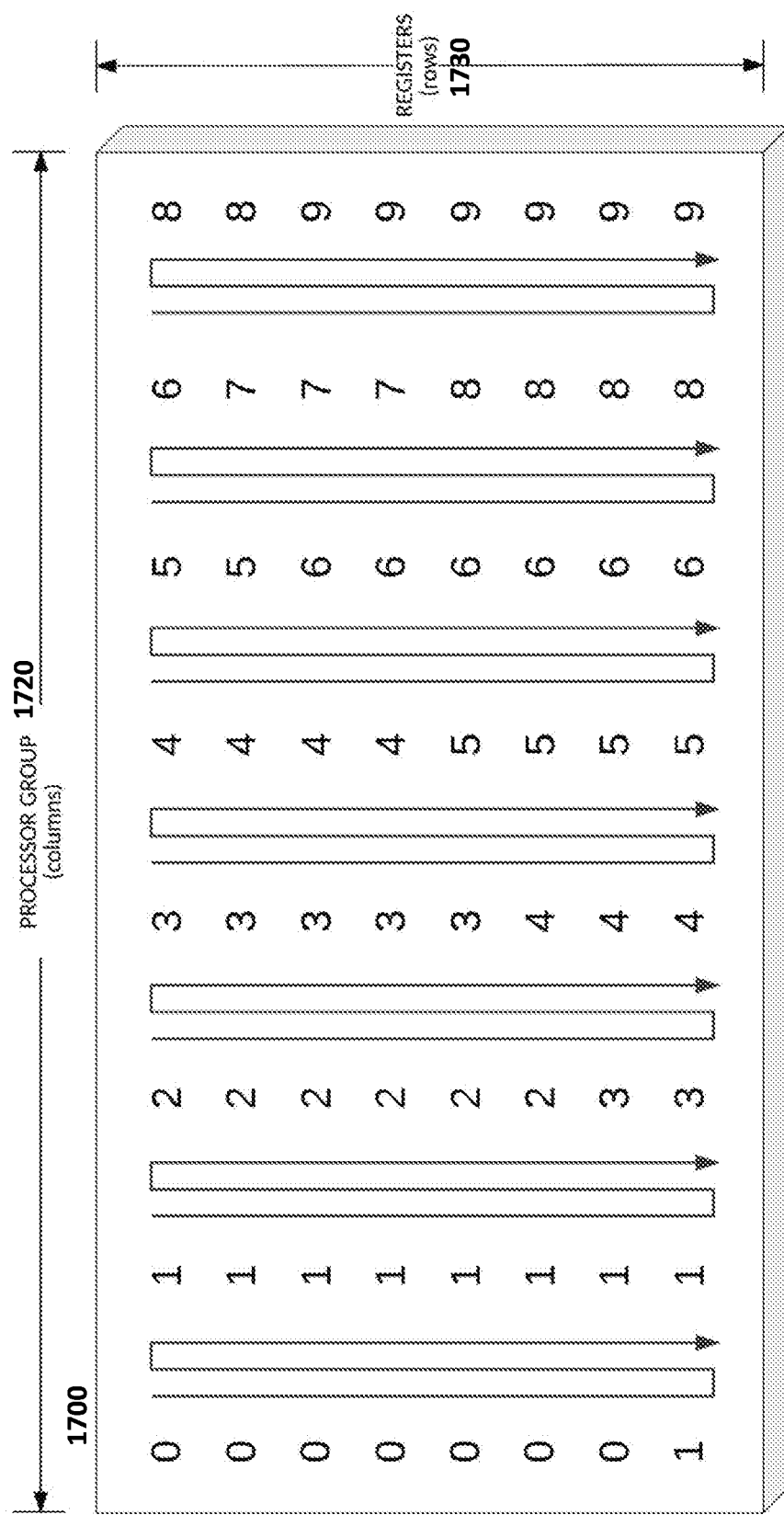

The processor group may merge and sort its respective data elements sequentially using a bitonic merging network, as described herein. For instance, as shown in FIG. 17D, a first group of processors 1761 may merge and sort their respective data elements in a serpentine pattern. The same may occur for the second group of processors 1762, as further shown in FIG. 17D. The data elements of the two groups of processors 1761 and 1762 may then be merged together to generate a completely sorted slab, as shown in FIG. 17E. Although FIGS. 17A-17E show eight processors and eight register rows, any number of processors and/or register rows may be used, limited only by the parallel processing devices capabilities.

Figure 18A:
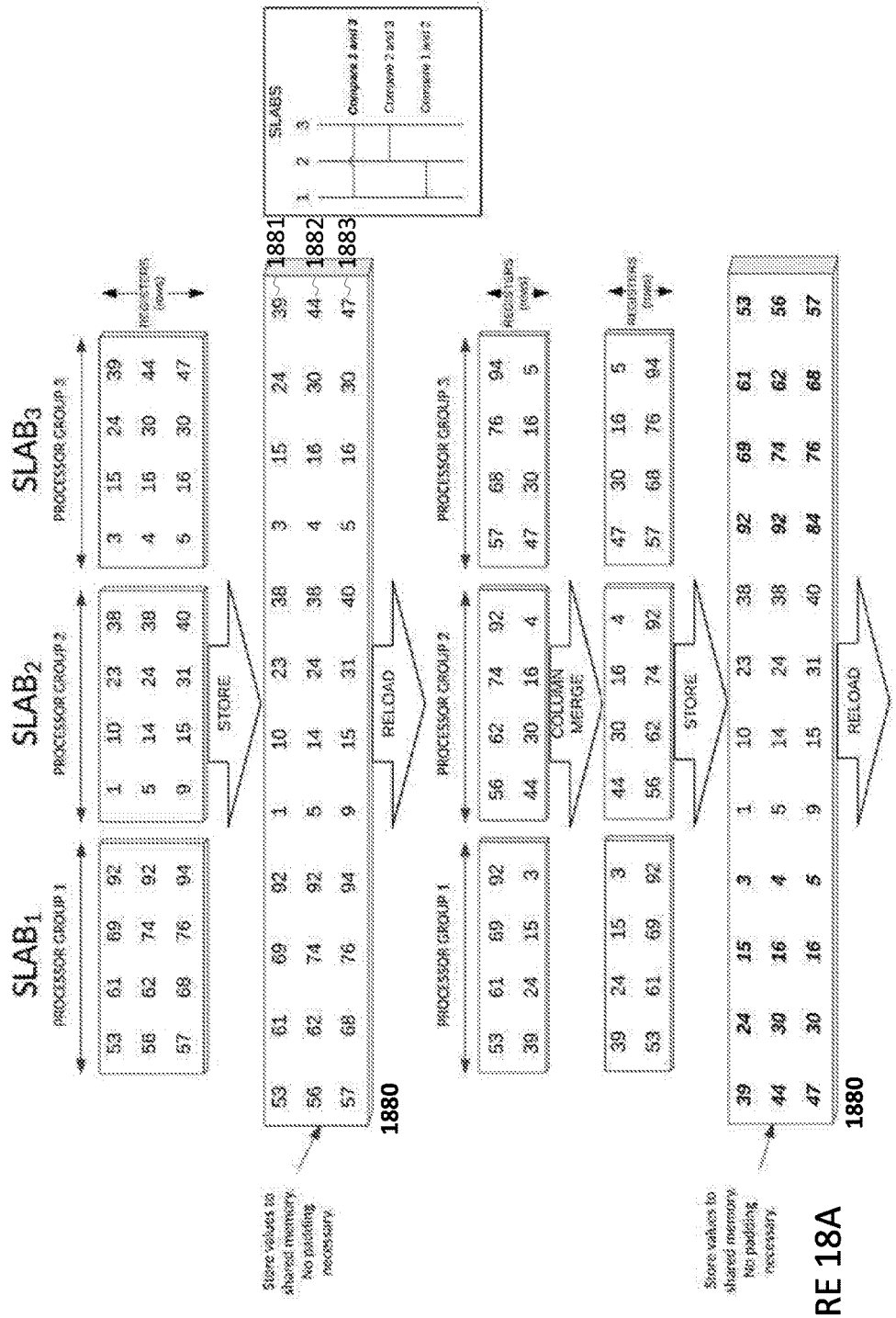
FIGS. 18A-18B are an example flow chart of a generalized multi-slab flip merge in accordance with aspects of the disclosure.
Figure 18B:
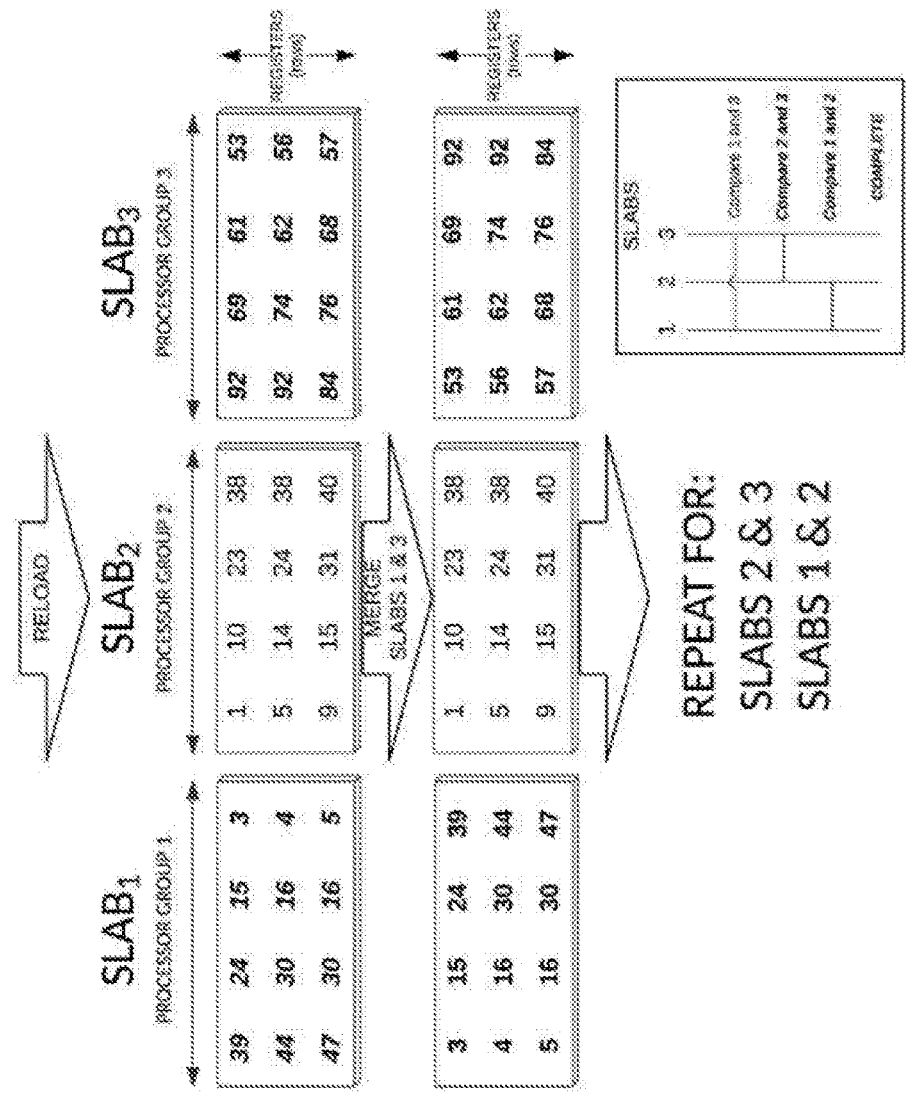

In the event the number of slabs being merged is not a power of two, a generalized merge may be used. An example generalized merge is illustrated in FIGS. 18A and 18B with three processor groups having three register rows of four elements, although any number of processor groups, register rows, and elements may be used. Referring to FIG. 18A, three sorted slabs ($slab_1$ . . . slab3) may be stored in the register rows of three processor groups (Processor Group 1-Processor Group 3), respectively. Each processor group may load the data elements stored in their respective sorted slabs into shared memory 1880.

Each processor group may reload the first four and last four data elements in each row of shared memory into their respective registers. For instance, Processor Group 1 may load the first and last four data elements in row 1881 of shared memory into its first and register rows, respectively. Processor Groups 2 and 3 may do the same for rows 1882 and 1883, respectively. The processor groups may then merge the columns to sort the data elements in their respective columns in ascending order, as further shown in FIG. 18A. The sorted data elements may then be stored back into the shared memory as further shown in FIG. 18A.

Referring to FIG. 18B, the sorted data elements may be read back into the slabs by columns. For instance $slab_1$ may load the first four columns of shared memory into its slab, $slab_2$ may load the next four columns, and $slab_3$ the final four columns. $Slab_1$ and $slab_3$ may then be merged followed by slabs 2 and 3, and finally slabs 1 and 2 being merged, as further shown in FIG. 18B.

In the event more data elements than can be fit into NSPB slab are to be sorted, grids of processor blocks may be used. In this regard, merging data elements that are larger than NSPB slabs worth of data can be accomplished by using global memory and without synchronization. In this regard, the use of a special read access pattern followed by further merge processing in registers and then a final write may be performed.

To summarize, data elements may be sorted through the following steps:
1. For all slabs:
  1.1. For each block of slabs:
    1.1.1. For each slab in the block:
      1.1.1.1. Slab Load
      1.1.1.2. Slab Sort
    1.1.2. Until all slabs in the block are merged:
      1.1.2.1. Multi-Slab Flip Merge
      1.1.2.2. If necessary, Slab Half Merge
    1.1.3. Slab Store In the event slabs are spread across a grid, additional merging of slabs across memory, such as shared memory, may be required. In this regard, a number of different merge steps, including Streaming Flip Merge, Streaming Half Merge, Multi-Slab Half Merge, and Slab Half Merge may be performed. The order of the additional merge steps, and other such steps required to sort the data elements may be as follows:

1. Until all slabs are merged (e.g., for slabs spread across a grid):
  1.1. Streaming Flip Merge
  1.2. If necessary, Streaming Half Merge
  1.3. If necessary, Multi-Slab Half Merge
  1.4. If necessary, Slab Half Merge
  1.5. If complete:
    1.5.1. Optionally, Report Key Changes
    1.5.2. Optionally Slab Transpose & Store
  1.6. Otherwise: Slab Store
2. Done The streaming flip merge, as illustrated in FIG. 18, is implemented through Algorithm 4, below. In this regard, the streaming flip merge may be a bitonic merge defined by (N×|ProcessorGroup|) inputs with one load step and one store step per input.

---
Algorithm 4
---

1. Given: a sequence of input slabs
2. Load slab rows with interleave k in the slab merging pattern illustrated in the diagram. Specifically, N/2 rows interleaved by k are read from the beginning of the sequence of slabs toward the end and N/2 rows interleaved by k are loaded from the end of the sequence of slabs toward the beginning, as shown in FIG. 16.
3. The left and right rows are immediately compare-and-exchanged.
4. The left rows are merged with a per-processor sequential bitonic merging network and written back to their original locations. The right rows are also then merged with a per-processor sequential bitonic merging network and written back to their original locations.

---

Figure 19:
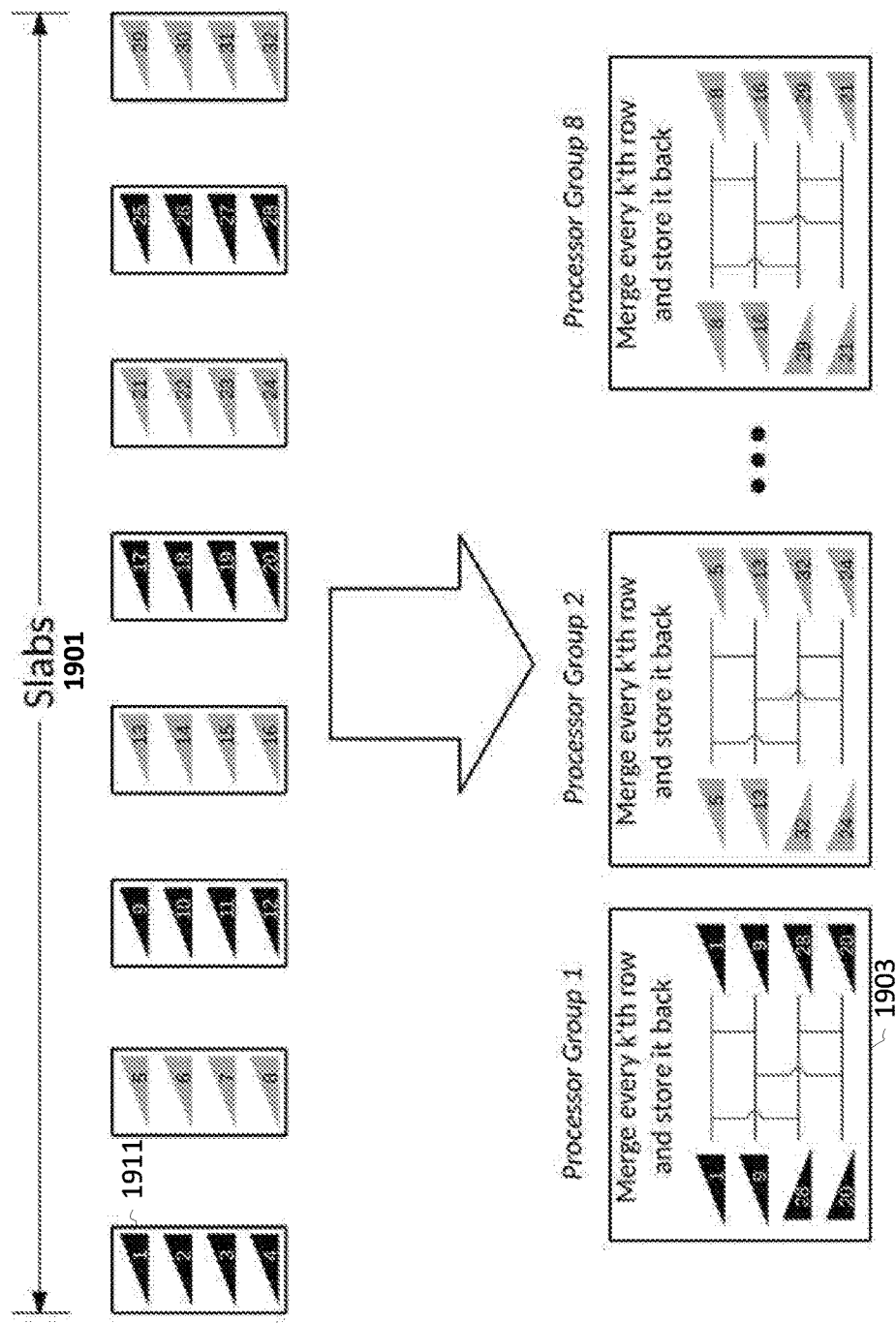
FIG. 19 is an example illustration of a streaming flip merge in accordance with aspects of the disclosure.

An illustration of the streaming flip merge is shown in FIG. 19. The streaming flip merge of FIG. 19 illustrates a streaming flip merge having an interleave of k=2, eight slabs 1901, and eight processors groups (i.e., Processor Group 1-Processor Group 8.) Each Processor Group may merge every k'th row in a slab, as illustrated in FIG. 19 and according to Algorithm 4, above. Each triangle 1911 illustrates a row of registers, with each register being in increasing order. For clarity only a single register row is labeled. In this regard, the horizontal rows may be increasing even though the slab is sorted in serpentine order. According to the Nakatani/Liszka property merging a number of rows is equivalent to merging 'N' strided sets of rows (every N'th row) and then merging those N adjacent rows. As further shown in FIG. 19, the triangles reversed in the processor groups show that the row is read in reverse order (e.g., "flipped") so that all of the rows together form a bitonic sequence. In the event the output of the streaming flip merge is still too large to be merged with a multi-slab half merge then a streaming half merge, as described herein, is repeatedly used until the neighboring slabs will fit into the multi-slab merge implementation. The wire diagram 1903, as shown at the bottom of FIG. 19 represents the order in which rows are compared. For instance, from left to right rows 1 and 3 are compared, then 2 and 4 and then, simultaneously 1&2 and 2&4.

Figure 20:
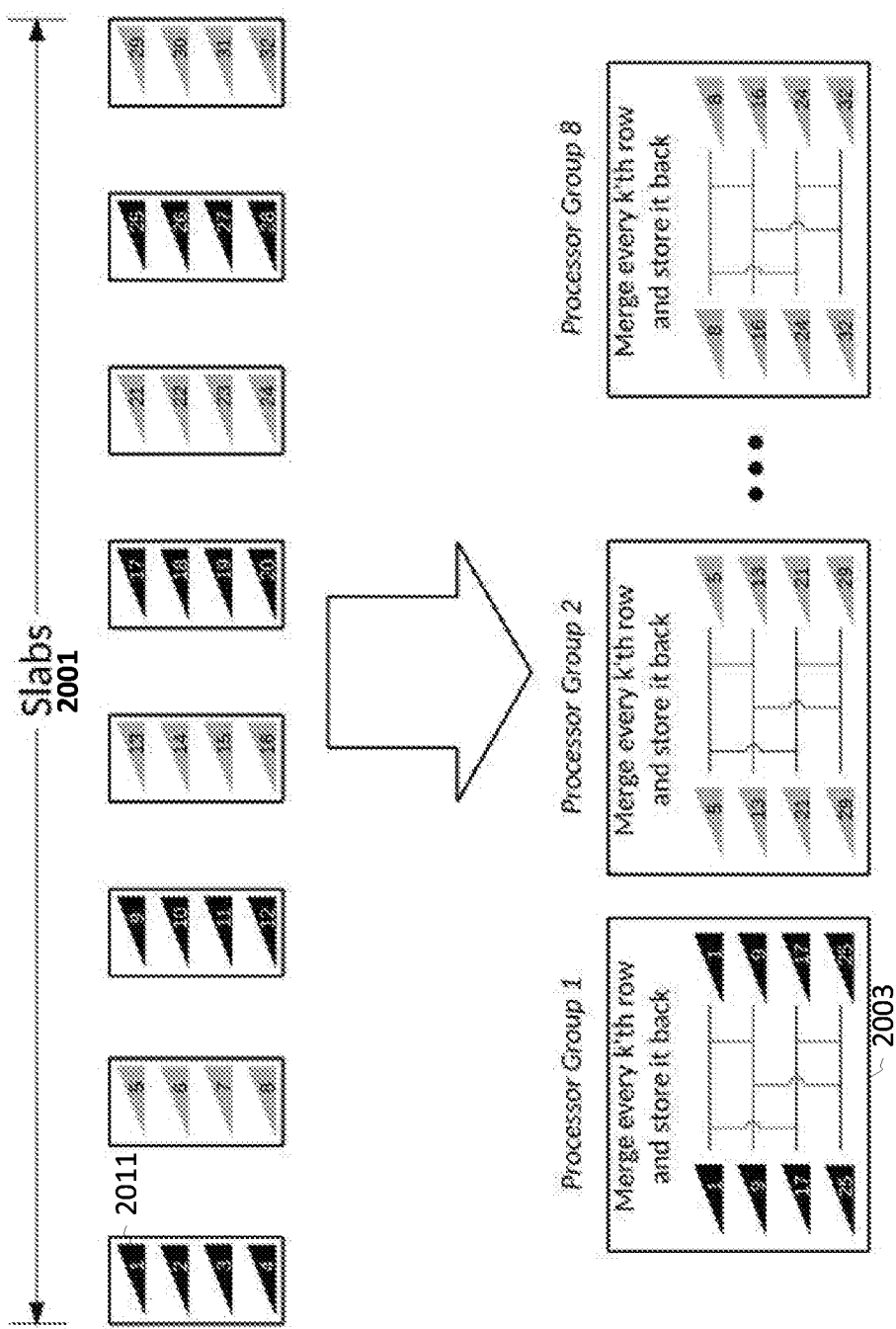
FIG. 20 is an example illustration of a streaming half merge in accordance with aspects of the disclosure.

In some instances a streaming half merge, as illustrated in FIG. 20 may be necessary to sort all of the slabs. The streaming half merge of FIG. 20 illustrates a streaming half merge having an interleave of k=2, eight slabs 2001, and eight processors groups (i.e., Processor Group 1-Processor Group 8.) Each Processor Group may merge every k'th row in a slab, as illustrated in FIG. 20. As with FIG. 19, the triangle 2011 illustrates a row of registers, with each register being in increasing order. For clarity only a single register row is labeled. In this regard, the horizontal rows may be increasing even though the slab is sorted in serpentine order. According to the Nakatani/Liszka property merging a number of rows is equivalent to merging 'N' strided sets of rows (every N'th row) and then merging those N adjacent rows. The wire diagram 2003, as shown at the bottom of FIG. 20 represents the order in which rows are compared. For instance, from left to right rows 1 and 3 are compared, then 2 and 4 and then, simultaneously 1&2 and 2&4.

Figure 21A:
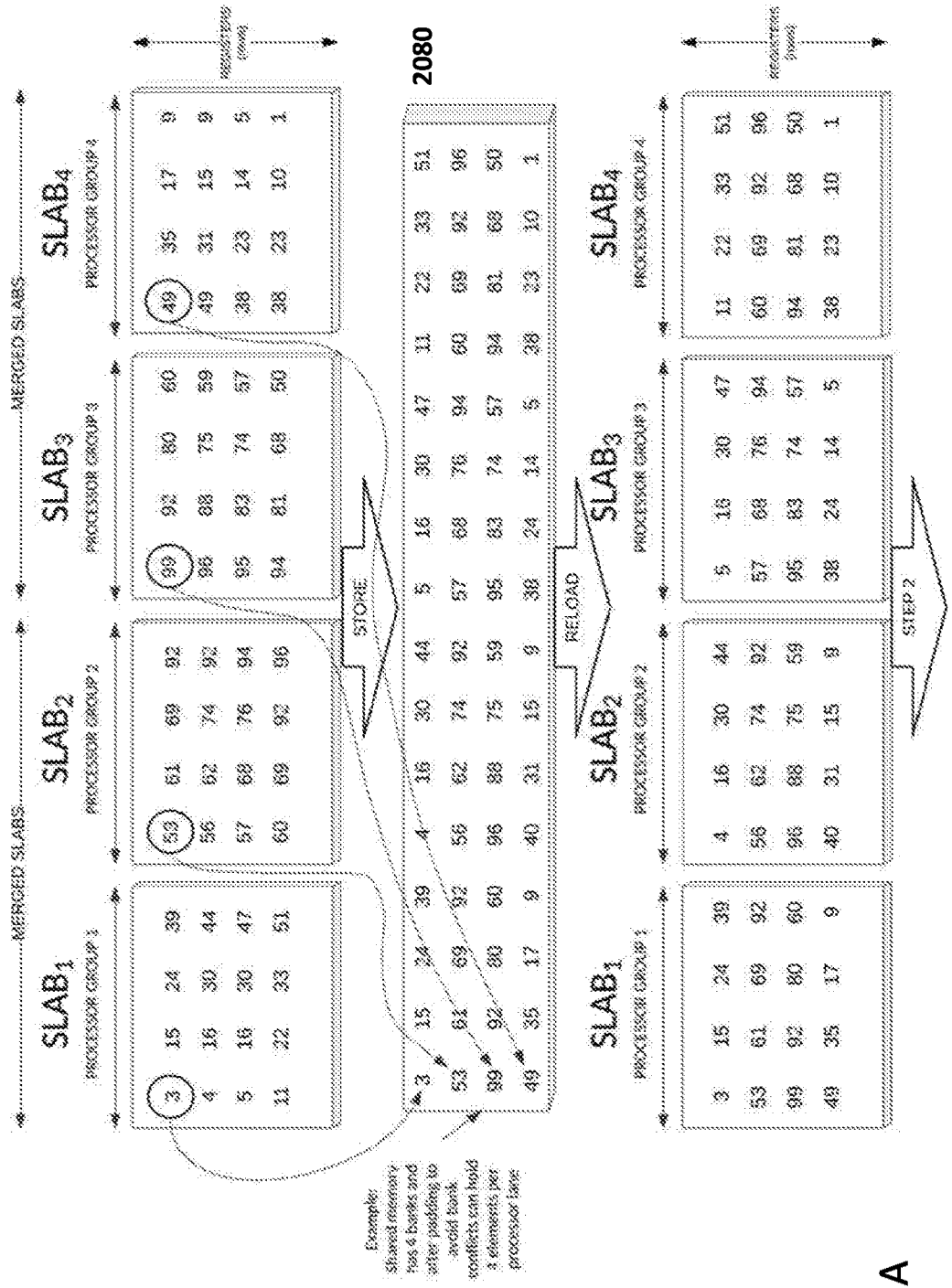
FIGS. 21A-21B are an example flow chart of a multi-slab half merge in accordance with aspects of the disclosure.
Figure 21B:
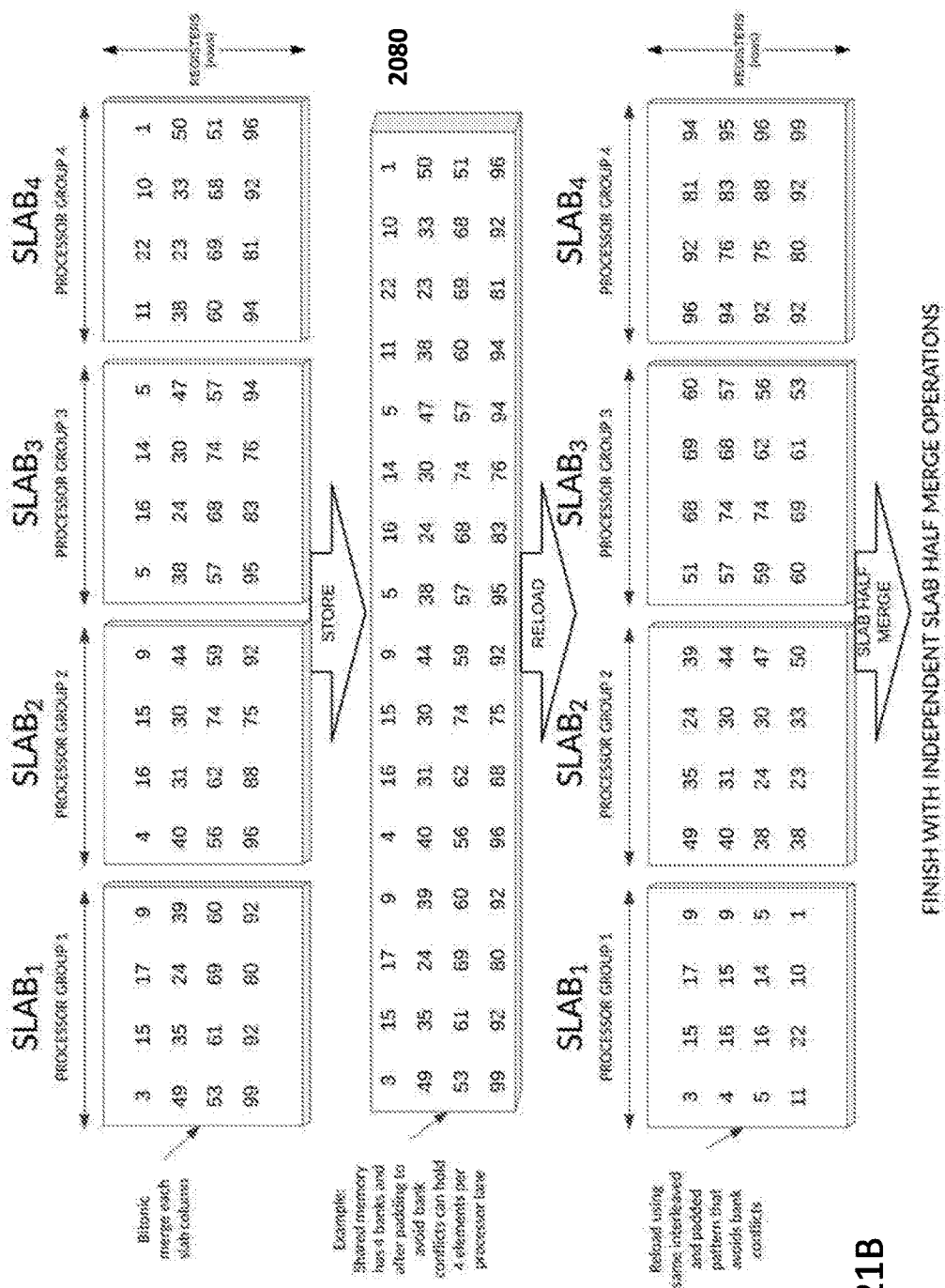
Figure 22:
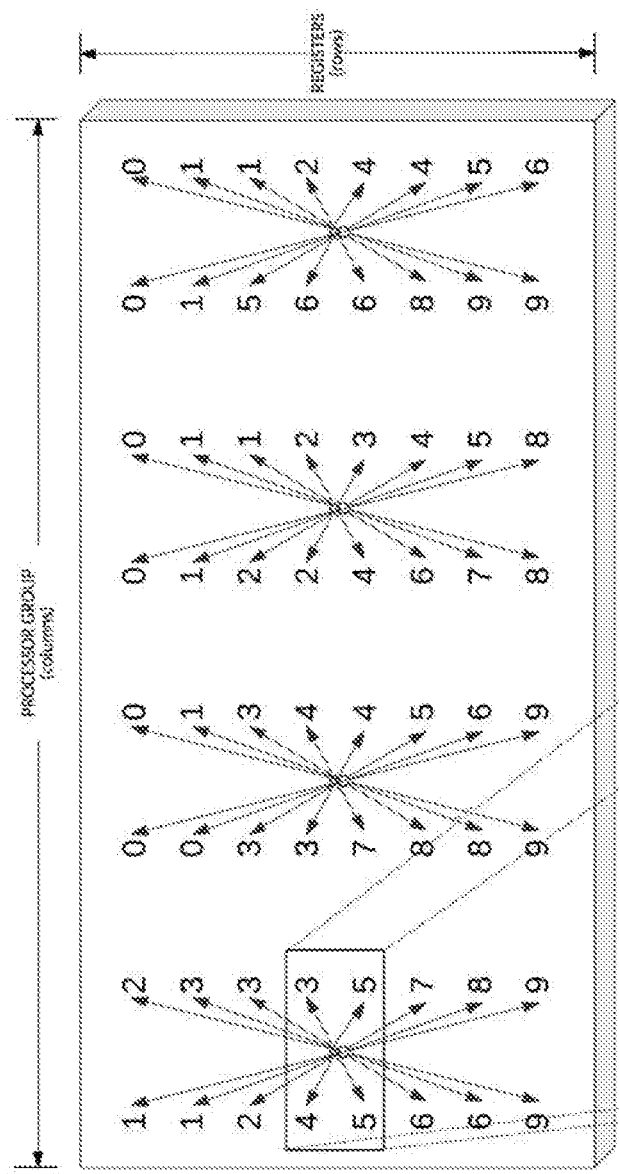
FIG. 22 is an example illustration of a slab flip merge shuffle in accordance with aspects of the disclosure.

In some instances, a multi-slab half merge may be performed. The multi-slab half merge is similar to the multi-slab flip merge, but instead of the second half of the processor groups loading the data elements to shared memory in a reverse order, they load the data elements in the same fashion as the first half of the processor groups. For example, FIGS. 21 and 22 illustrate a multi-slab half merge with four sorted slabs ($slab_1 \ldots slab_4$) stored in the register rows of four processor groups (Processor Group 1-Processor Group 4), respectively. Each processor group may load the data elements stored in their respective sorted slabs into shared memory 1680. Bank conflicts may be avoided while loading the slabs into shared memory by using the techniques described further herein. As shown in FIG. 21A, all of the processor groups (i.e., Processor Groups 1-4) may add the data elements stored in their respective slabs in a descending order by register row to the shared memory 2080 (e.g., left to right starting from the top left). Each processor group may then reload a predefined number of columns (such as four, as shown in FIG. 21A) back into their respective register rows from the shared memory 2080.

Upon each processor group reloading their respective register rows, the processor groups (Processor Group 1-Processor Group 4) may each perform a bitonic merge of each column in respective slab ($slab_1$-$slab_4$), as shown in FIG. 20B. Each processor group may then load the data elements stored in their respective slabs back into shared memory 2080. Bank conflicts may again be avoided while loading the slabs into shared memory by using the techniques described further herein.

Each processor group may again reload a predefined number of rows (such as one, as shown in FIG. 20B) back into their respective register rows from the shared memory 1680. In this regard, the first half of the processor groups (i.e., Processor Groups 1 and 2) may load the data elements from the first and second rows of shared memory 2080, respectively, to their respective register rows in a descending order by register row (e.g., left to right starting from the top left), while the second half of processor groups (i.e., Processor Groups 3 and 4) may add the data elements from the third and further rows of the shared memory 2080, respectively, into their respective register rows in a reverse and ascending order by register row (e.g., right to left starting from the bottom right), where the second half of the processor groups read the shared memory from right to left, as further shown in FIG. 20B. In other words, the first half of the processor groups may load the data elements stored in the top half of rows of the shared memory into slabs in a descending order by register row, while the second half of processor groups may load the bottom half of data elements stored in bottom rows of the shared memory in a reverse and ascending order by register row to complete the multi-slab flip merge. Although FIGS. 20A and 20B show only four processor groups, any number of even processor groups may be used. Upon completing the loading of the slabs, each processor group may perform a slab half merge to sort their respective slabs.

In general, half merges are used after flip merges. In this regard, flip merges takes two sorted spans whether they're rows, columns, slabs, multiple slabs, stride slabs, etc., and merges them. In order to merge them, they should form a bitonic sequence. As such, they must increase then decrease in value (or vice versa). The flip merge takes the lower half of the already sorted span to be sorted (which is increasing) and then reads the upper half in reverse order (which is decreasing). Those two sequences combine to form a bitonic sequence which can then be merged with a bitonic merging network.

Upon completion of a flip merge of slabs, multi-slabs or strided rows is complete, the output is a bitonic sequence. The bitonic sequence needs to continue to be recursively merged until merging a single column, which indicates the merging is complete. In summary, the Streaming Half Merge is used when there are more (strided) slabs than can be merged in a Multi-Slab Merge. The Multi-Slab Half merge is used when there is more than one slab to be merged (and can be "held" by the implementation on the device). The Slab Half Merge merges between 1 and |Processor Group| columns.

In some instances the slab flip merge and slab half merge may take advantage of a parallel processing devices capabilities, by exploiting the devices shuffle operation. The shuffle operation, also known as a permute, vector permutation, butterfly, or butterfly exchange, allows processors in a processor group (i.e. lanes in a warp) to exchange values with each other. A shuffle can be implemented in the event there is hardware support for inter-processor communication in a processor group. As such, the parallel computing device may avoid storing values to shared memory and then reloading them while performing the slab flip merge and slab half merge. In general, if the processor group supports a shuffle operation, then an individual slab can be sorted, and either flip or half-merged without using shared memory.

For instance, FIG. 22 shows a slab flip merge shuffle of $slab_n$, wherein neighboring processors in a processor group compare and exchange data elements within their registers without the need to write or read to shared memory. The slab flip merge shuffle may be completed by performing a bitonic merge, as described herein, to complete the sorting of the $slab_n$.

Figure 23:
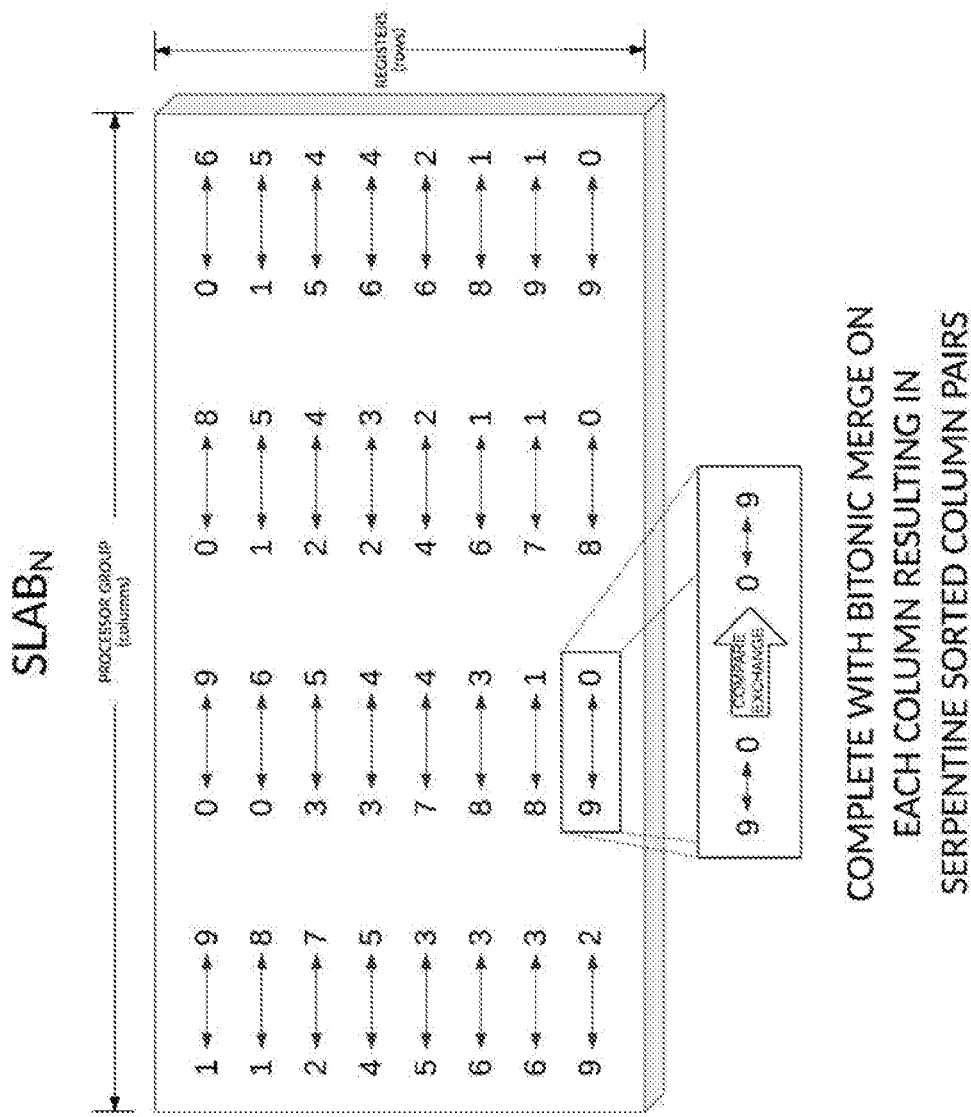
FIG. 23 is an example illustration of a slab half merge shuffle in accordance with aspects of the disclosure.

FIG. 23 shows a slab half merge shuffle of $slab_n$ wherein neighboring processors in a processor group compare and exchange data elements within the same register row without the need to write or read to shared memory. The slab half merge shuffle may be completed by performing a bitonic merge, as described herein, to complete the sorting of the $slab_n$.

To avoid conflicts bank access patterns that will be applied during the merge phase may be determined and a proper XOR value that will guarantee that no conflicts ever occur may be calculated. In this regard, a total of NSK data elements need to be found for a given set of access patterns. Finding a proper XOR value may be accomplished by searching through (|ProcessorGroup|/NSK) combinations until one is found. By using hashing conflict-free merging may occur without any additional padding of processor-groups or rows, which may be beneficial when trying to maximize the number of data elements that can be stored in shared memory during merge steps.

Another technique for avoiding bank conflicts that is an alternative to hashing is accomplished by padding extra words of shared memory to the end of each warp's worth of data and extra words of data to each row's worth of warps. Calculation of the proper padding value is may be performed as follows:

COLUMN-PAD: 1

ROW-PAD: NSK+(SLABSPERBLOCK+
(|PROCESSORGROUP|+NSK))

These calculated padding values allow Algorithm 2 to perform a bank-conflict-free merge.

Upon merging all of the sorted slabs, sorting of the data elements may be complete. The sorted data elements may then be output via transposition and stored to memory in a linear order for further interaction with other programs or storage. Such transposition and sorting may be controlled by a slab transpose & store kernel. Key changes may also be tracked through the sorting and merging steps. These key changes may be reported to the respective processors to assure all processors know where particular data elements are. Such key changes may be controlled by a report key change kernel.

All of the above merging and sorting methods may be called, executed, and/or otherwise controlled by one or more processors, computing devices, or parallel computing devices. In this regard, each of the merging and sorting methods may be implemented as kernels to be called by the one or more computing devices, such as GPU 170. As described above, the parallelized processing pipeline may be implemented and controlled through customized application programming interfaces (APIs) which provide the data-parallel computing device, such as a graphics processing unit (GPU), with access to the kernel programs which perform the processing including the merging and sorting kernels. In this regard, each respective kernel may constitute a portion of the parallelized processing pipeline, with each kernel utilizing standard or customized APIs and sub-APIs to perform all of the processing of the sorting, merging, mapping, etc., of the data elements.

Figure 24:
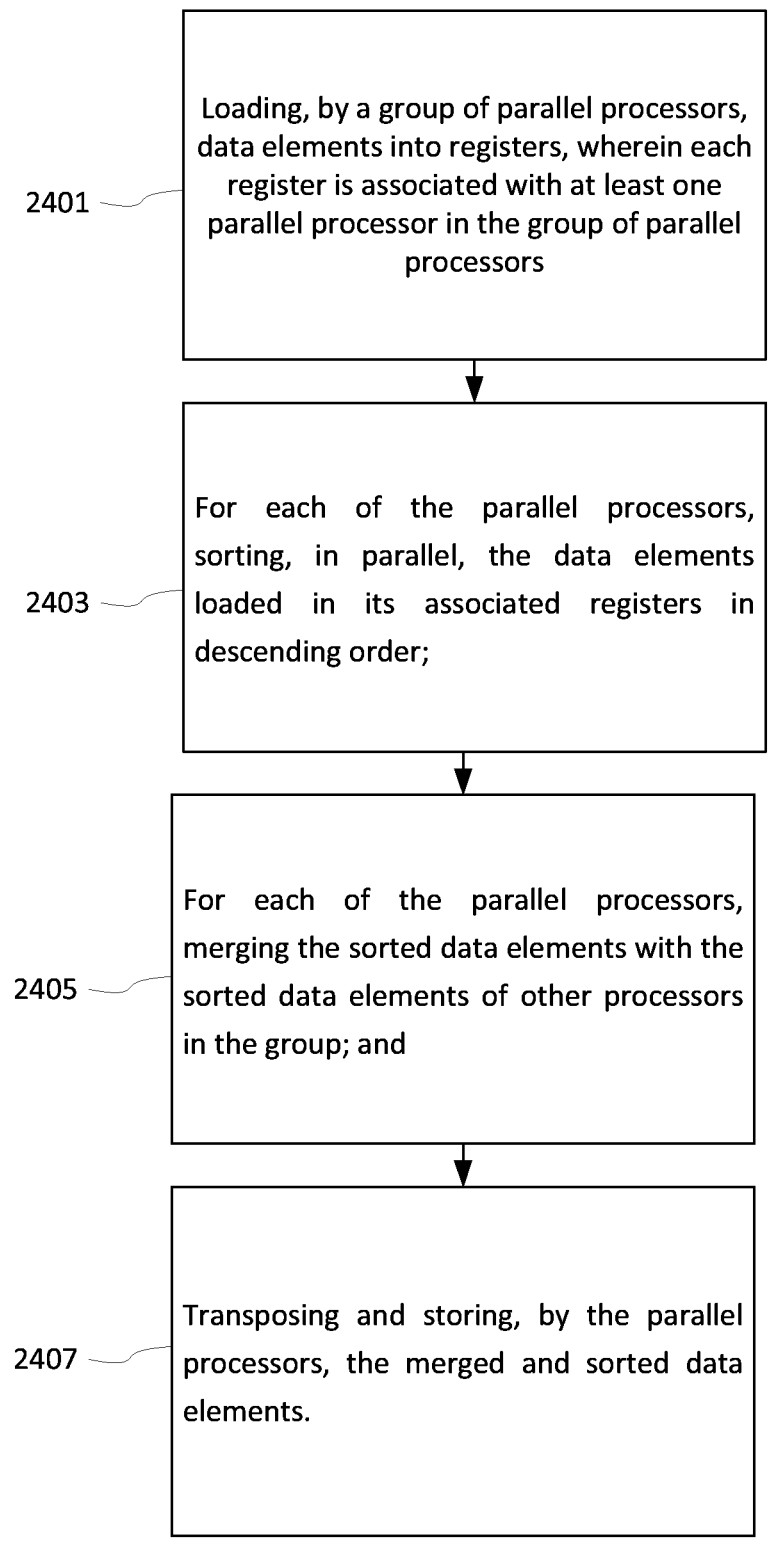
FIG. 24 is a flow diagram in accordance with an embodiment.

Flow diagram 2400 of FIG. 24 is an example flow diagram of some of the aspects described above that may be performed by one or more computing devices such as GPU 170. In this example, at block 2401, one or more computing devices may load data elements into registers, wherein each register is associated with at least one parallel processor in a group of parallel processors. For each of the parallel processors, the data elements loaded in its associated registers may be sorted, in parallel, in descending order, as shown in block 2403. The sorted data elements, for each of the parallel processors, may be merged with the sorted data elements of other processors in the group, as shown in block 2405. The merged and sorted data elements may be transposed and stored, as shown in block 2407.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

APPENDIX A

The SHCB Macros Used in Algorithm 3

NSKM := (NSK−1)
NSPB := (NUM_SLABS_PER_BLOCK)
NSPBM := (NSPB−1)
LNSK(LVL) := (($_{LVL}$)/NSK)
LNSKM(LVL) := (LNSK($_{LVL}$)−1)
WADJ(WS,N) := (($_N$) + ((($_N$) / WARP_SIZE) * (($_{WS}$)−WARP_SIZE)))
//
// SHARED HALF CLEAN BLOCK -- REUSED BY FLIP CLEAN BLOC K
//
SHCB_BASE$_{(LVL,WS,WID,LID)}$ :=
    (((LNSK$_{(LVL)}$) >= NSPB) ? 0 : (($_{WID}$/LNSK$_{(LVL)}$) * WADJ($_{WS,LVL}$)) +
    (($_{LID}$ & (WNSKM & ~(_MAX(LVL/(NSPB * NSK),1)−1))) * WADJ($_{WS}$,NSPB * NSK)))
//
// IF NSPB IS GREATER THAN 32 THEN TWEAK THIS WITH ANOTHER WADJ( ) .
//
SHCB_OFFSET$_{(LVL,WS,WID,LID)}$ :=
    (((LNSK$_{(LVL)}$) > NSPB)
    (($_{WID}$ & NSKM) +
    WADJ$_{WS}$,(($_{WID}$ & (~NSKM & NSPBM)) * (LNSK$_{(LVL)}$/WARP_SIZE)))) :
    (LNSK$_{(LVL)}$ < NSPB) ? ($_{WID}$ & LNSKM$_{(LVL)}$) : $_{WID}$) +
    (($_{LID}$ & (WNSKM & (_$_{MAX(LVL}$/(NSPB*NSK),1)−1))) * NSK))
SHCB$_{(LVL,WS,WID,LID)}$ := (SHCB_BASE$_{(LVL,WS,WID,LID)}$ + SHCB_OFFSET$_{(LVL,WS,WID,LID)}$)

The invention claimed is:

1. A computer-implemented method for performing multiple processing tasks of sorting a plurality of data elements in parallel using a parallelized processing pipeline of a group of parallel processors of a computer system, the method being performed by the group of parallel processors and comprising the steps of:
    executing at least one of a plurality of kernels to load a plurality of data elements from a shared memory into a plurality of slabs of registers, wherein each kernel of the plurality of kernels constitutes a respective portion of the parallelized processing pipeline, each slab of registers includes a two-dimensional array of registers having a plurality of register rows and a plurality of register columns, and each slab of registers is associated with at least one parallel processor in the group of parallel processors;
    executing at least one of the plurality of kernels to sort a first portion of the plurality of data elements loaded into register rows of a first half of the plurality of slabs of registers in a descending order, and a second portion of the plurality of data elements loaded into register rows of a second half of the plurality of slabs of registers in a reverse and ascending order;
    storing the sorted data elements in the shared memory;
    reloading from the shared memory into each respective slab of the plurality of slabs of registers, a subset of the sorted data elements of each of the plurality of register rows stored in the shared memory;
    executing at least one of the plurality of kernels to merge and sort the reloaded data elements; and
    storing the merged and sorted reloaded data elements in the shared memory, wherein the computer-implemented method is adapted to enhance speed and efficiency of the parallelized processing pipeline by performing all of the multiple processing tasks of sorting the data elements using the parallelized processing pipeline so that the computer system is free to perform other processing tasks simultaneously.

2. The method of claim 1, wherein upon each processor in the group of parallel processors reloading the subset of the sorted data elements, performing by the group of parallel processors, a bitonic merge of each register column of the plurality of register columns in each of the plurality of slabs of registers.

3. The method of claim 1, wherein a number of the register columns of the two-dimensional array of registers corresponds to a number of processors in the group of parallel processors.

4. The method of claim 1, wherein the plurality of data elements are loaded into the plurality of slabs of registers in a transposed order.

5. A computer system for performing multiple processing tasks of sorting a plurality of data elements in parallel, the system comprising:
    a shared memory; and
    a parallelized processing pipeline of a group of parallel processors coupled with the shared memory, the group of parallel processors being configured to:
        execute at least one of a plurality of kernels to load, from the shared memory, a plurality of data elements into a plurality of slabs of registers, wherein each kernel of the plurality of kernels constitutes a respective portion of the parallelized processing pipeline, each slab of registers includes a two-dimensional array of registers having a plurality of register rows and a plurality of register columns, and each slab of registers is associated with at least one parallel processor in the group of parallel processors;
    execute at least one of the plurality of kernels to sort a first portion of the plurality of data elements loaded into register rows of a first half of the plurality of slabs of registers in a descending order, and a second portion of the plurality of data elements loaded into register rows of a second half of the plurality of slabs of registers in a reverse and ascending order;
    store the sorted data elements in the shared memory;
    reload, from the shared memory into each respective slab of the plurality of slabs of registers, a subset of the sorted data elements of each of the plurality of register rows stored in the shared memory;
    execute at least one of the plurality of kernels to merge and sort the reloaded data elements; and
    store the merged and sorted reloaded data elements in the shared memory, wherein the computer system is adapted to enhance speed and efficiency of the parallelized processing pipeline by performing all of the multiple processing tasks of sorting the data elements using the parallelized processing pipeline so that the computer system is free to perform other processing tasks simultaneously.

6. The system of claim 5, wherein upon each processor in the group of parallel processors reloading the subset of the sorted data elements, performing, by the group of parallel processors, a bitonic merge of each register column of the plurality of register columns in each of the plurality of slabs of registers.

7. The system of claim 5, wherein a number of the register columns of the two-dimensional array of registers corresponds to a number of processors in the group of parallel processors.

8. The system of claim 5, wherein the plurality of data elements are loaded into the plurality of slabs of registers in a transposed order.

9. A non-transitory computer readable medium comprising instructions, which when executed by a parallelized processing pipeline of a group of parallel processors of a computer system, cause the group of parallel processors to perform multiple processing tasks of sorting a plurality of data elements in parallel, the group of parallel processors being configured to:

execute at least one of a plurality of kernels to load, from a shared memory, a plurality of data elements into a plurality of slabs of registers, wherein each kernel of the plurality of kernels constitutes a respective portion of the parallelized processing pipeline, each slab of registers includes a two-dimensional array of registers having a plurality of register rows and a plurality of register columns, and each slab of registers is associated with at least one parallel processor in the group of parallel processors;

execute at least one of the plurality of kernels to sort a first portion of the plurality of data elements loaded into register rows of a first half of the plurality of slabs of registers in a descending order, and a second portion of the plurality of data elements loaded into register rows of a second half of the plurality of slabs of registers in a reverse and ascending order;

store the sorted data elements in the shared memory;

reload, from the shared memory into each respective slab of the plurality of slabs of registers, a subset of the sorted data elements of each of the plurality of register rows stored in the shared memory;

execute at least one of the plurality of kernels to merge and sort the reloaded data elements; and store the merged and sorted reloaded data elements in the shared memory, wherein the non-transitory computer readable medium is adapted to enhance speed and efficiency of the parallelized processing pipeline by performing all of the multiple processing tasks of sorting the data elements using the parallelized processing pipeline so that the computer system is free to perform other processing tasks simultaneously.

10. The non-transitory computer readable medium of claim 9, wherein upon each processor in the group of parallel processors reloading the subset of the sorted data elements, performing, by the group of parallel processors, a bitonic merge of each register column of the plurality of register columns in each of the plurality of slabs of registers.

11. The non-transitory computer readable medium of claim 9, wherein a number of the register columns of the two-dimensional array of registers corresponds to a number of processors in the group of parallel processors.

12. The non-transitory computer readable medium of claim 9, wherein the plurality of data elements are loaded into the plurality of slabs of registers in a transposed order.

* * * * *